(12) United States Patent
Kumar et al.

(10) Patent No.: US 12,284,129 B2
(45) Date of Patent: Apr. 22, 2025

(54) VARYING DENSITIES FOR PHASE-TRACKING REFERENCE SIGNALS

(71) Applicant: QUALCOMM Incorporated, San Diego, CA (US)

(72) Inventors: Satish Kumar, Hyderabad (IN); Sarath Pinayour Chandrasekaran, Hyderabad (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/663,094

(22) Filed: May 12, 2022

(65) Prior Publication Data

US 2023/0370226 A1    Nov. 16, 2023

(51) Int. Cl.
*H04L 5/00*    (2006.01)
(52) U.S. Cl.
CPC .......... *H04L 5/0051* (2013.01); *H04L 5/0092* (2013.01)
(58) Field of Classification Search
None
See application file for complete search history.

(56) References Cited

U.S. PATENT DOCUMENTS

2019/0387547 A1* 12/2019 Shin .................. H04W 74/0866

FOREIGN PATENT DOCUMENTS

| CN | 115176498 A | * | 10/2022 | ........... H04L 1/0003 |
| WO | WO-2019029338 A1 | * | 2/2019 | ........... H04L 27/261 |
| WO | WO-2019160378 A1 | * | 8/2019 | ........... H04L 1/0003 |
| WO | WO-2021168720 A1 | * | 9/2021 | ........... H04L 1/0003 |
| WO | WO-2022115884 A2 | * | 6/2022 | |

* cited by examiner

*Primary Examiner* — Shukri Taha
(74) *Attorney, Agent, or Firm* — Harrity & Harrity, LLP

(57) ABSTRACT

Various aspects of the present disclosure generally relate to wireless communication. In some aspects, a user equipment may receive an indication of a non-uniform density associated with a phase-tracking reference signal (PT-RS). Accordingly, the UE may transmit, or receive, within a slot, wherein the slot includes the PT-RS at the non-uniform density across a plurality of symbols of the slot. For example, the non-uniform density may be applied based on an offset between the slot and a previous downlink slot including a demodulation reference signal. Numerous other aspects are described.

28 Claims, 16 Drawing Sheets

| Slot Index | 0 | 1 | 2 | 3 | 4 | 5 | 6 | 7 | 8 | 9 |
|---|---|---|---|---|---|---|---|---|---|---|
| Slot type | D | D | D | S | U | D | D | D | S | U |
| Channel | PDSCH w/ PT-RS (pattern 4) | PDSCH w/ PT-RS (pattern 3) | PDSCH w/ PTRS (pattern 2) | PDSCH w/ PT-RS (pattern 1) | PUSCH | PDSCH w/ PT-RS (pattern 4) | PDSCH w/ PT-RS (pattern 3) | PDSCH w/ PTRS (pattern 2) | PDSCH w/ PT-RS (pattern 1) | PUSCH |

| Slot Index | 0 | 1 | 2 | 3 | 4 | 5 | 6 | 7 | 8 | 9 |
|---|---|---|---|---|---|---|---|---|---|---|
| Slot type | D | D | D | D | D | D | D | S | U | U |
| Channel | PDSCH w/ DMRS | PDSCH | PDSCH w/ PTRS (pattern 1) | PDSCH | PDSCH w/ PTRS (pattern 2) | PDSCH | PDSCH w/ PTRS (pattern 3) | PDSCH | PUSCH | PUSCH |

VARYING DENSITIES FOR PHASE-TRACKING REFERENCE SIGNALS

FIELD OF THE DISCLOSURE

Aspects of the present disclosure generally relate to wireless communication and to techniques and apparatuses for varying densities for phase-tracking reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a plurality of densities associated with a phase-tracking reference signal (PT-RS). The method may include transmitting, or receiving, across a plurality of slots, wherein at least a first slot of the plurality of slots includes the PT-RS at a first density of the plurality of densities and a second slot of the plurality of slots includes the PT-RS at a second density of the plurality of densities.

Some aspects described herein relate to a method of wireless communication performed by a network entity. The method may include transmitting an indication of a plurality of densities associated with a PT-RS. The method may include receiving, or transmitting, across a plurality of slots, wherein at least a first slot of the plurality of slots includes the PT-RS at a first density of the plurality of densities and a second slot of the plurality of slots includes the PT-RS at a second density of the plurality of densities.

Some aspects described herein relate to a method of wireless communication performed by a UE. The method may include receiving an indication of a non-uniform density associated with a PT-RS. The method may include transmitting, or receiving, within a slot, wherein the slot includes the PT-RS at the non-uniform density across a plurality of symbols of the slot.

Some aspects described herein relate to a method of wireless communication performed by a network entity. The method may include transmitting an indication of a non-uniform density associated with a PT-RS. The method may include receiving, or transmitting, within a slot, wherein the slot includes the PT-RS at the non-uniform density across a plurality of symbols of the slot.

Some aspects described herein relate to an apparatus for wireless communication at a UE. The apparatus may include a memory and one or more processors. The one or more processors may be configured to receive an indication of a plurality of densities associated with a PT-RS. one or more processors may be configured to transmit, or receive, across a plurality of slots, wherein at least a first slot of the plurality of slots includes the PT-RS at a first density of the plurality of densities and a second slot of the plurality of slots includes the PT-RS at a second density of the plurality of densities.

Some aspects described herein relate to an apparatus for wireless communication at a network entity. The apparatus may include a memory and one or more processors. The one or more processors may be configured to transmit an indication of a plurality of densities associated with a PT-RS. The one or more processors may be configured to receive, or transmit, across a plurality of slots, wherein at least a first slot of the plurality of slots includes the PT-RS at a first density of the plurality of densities and a second slot of the plurality of slots includes the PT-RS at a second density of the plurality of densities.

Some aspects described herein relate to an apparatus for wireless communication at a UE. The apparatus may include a memory and one or more processors. The one or more processors may be configured to receive an indication of a non-uniform density associated with a PT-RS. The one or more processors may be configured to transmit, or receive, within a slot, wherein the slot includes the PT-RS at the non-uniform density across a plurality of symbols of the slot.

Some aspects described herein relate to an apparatus for wireless communication at a network entity. The apparatus may include a memory and one or more processors. The one or more processors may be configured to transmit an indication of a non-uniform density associated with a PT-RS. The one or more processors may be configured to receive, or transmit, within a slot, wherein the slot includes the PT-RS at the non-uniform density across a plurality of symbols of the slot.

Some aspects described herein relate to a non-transitory computer-readable medium that stores a set of instructions for wireless communication by a UE. The set of instructions, when executed by one or more processors of the UE, may cause the UE to receive an indication of a plurality of densities associated with a PT-RS. The set of instructions, when executed by one or more processors of the UE, may cause the UE to transmit, or receive, across a plurality of slots, wherein at least a first slot of the plurality of slots includes the PT-RS at a first density of the plurality of densities and a second slot of the plurality of slots includes the PT-RS at a second density of the plurality of densities.

Some aspects described herein relate to a non-transitory computer-readable medium that stores a set of instructions for wireless communication by a network entity. The set of instructions, when executed by one or more processors of the network entity, may cause the network entity to transmit an indication of a plurality of densities associated with a PT-RS. The set of instructions, when executed by one or more processors of the network entity, may cause the network entity to receive, or transmit, across a plurality of slots, wherein at least a first slot of the plurality of slots includes the PT-RS at a first density of the plurality of densities and a second slot of the plurality of slots includes the PT-RS at a second density of the plurality of densities.

Some aspects described herein relate to a non-transitory computer-readable medium that stores a set of instructions for wireless communication by a UE. The set of instructions, when executed by one or more processors of the UE, may cause the UE to receive an indication of a non-uniform density associated with a PT-RS. The set of instructions, when executed by one or more processors of the UE, may cause the UE to transmit, or receive, within a slot, wherein the slot includes the PT-RS at the non-uniform density across a plurality of symbols of the slot.

Some aspects described herein relate to a non-transitory computer-readable medium that stores a set of instructions for wireless communication by a network entity. The set of instructions, when executed by one or more processors of the network entity, may cause the network entity to transmit an indication of a non-uniform density associated with a PT-RS. The set of instructions, when executed by one or more processors of the network entity, may cause the network entity to receive, or transmit, within a slot, wherein the slot includes the PT-RS at the non-uniform density across a plurality of symbols of the slot.

Some aspects described herein relate to an apparatus for wireless communication. The apparatus may include means for receiving an indication of a plurality of densities associated with a PT-RS. The apparatus may include means for transmitting, or means for receiving, across a plurality of slots, wherein at least a first slot of the plurality of slots includes the PT-RS at a first density of the plurality of densities and a second slot of the plurality of slots includes the PT-RS at a second density of the plurality of densities.

Some aspects described herein relate to an apparatus for wireless communication. The apparatus may include means for transmitting an indication of a plurality of densities associated with a PT-RS. The apparatus may include means for receiving, or means for transmitting, across a plurality of slots, wherein at least a first slot of the plurality of slots includes the PT-RS at a first density of the plurality of densities and a second slot of the plurality of slots includes the PT-RS at a second density of the plurality of densities.

Some aspects described herein relate to an apparatus for wireless communication. The apparatus may include means for receiving an indication of a non-uniform density associated with a PT-RS. The apparatus may include means for transmitting, or means for receiving, within a slot, wherein the slot includes the PT-RS at the non-uniform density across a plurality of symbols of the slot.

Some aspects described herein relate to an apparatus for wireless communication. The apparatus may include means for transmitting an indication of a non-uniform density associated with a PT-RS. The apparatus may include means for receiving, or means for transmitting, within a slot, wherein the slot includes the PT-RS at the non-uniform density across a plurality of symbols of the slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
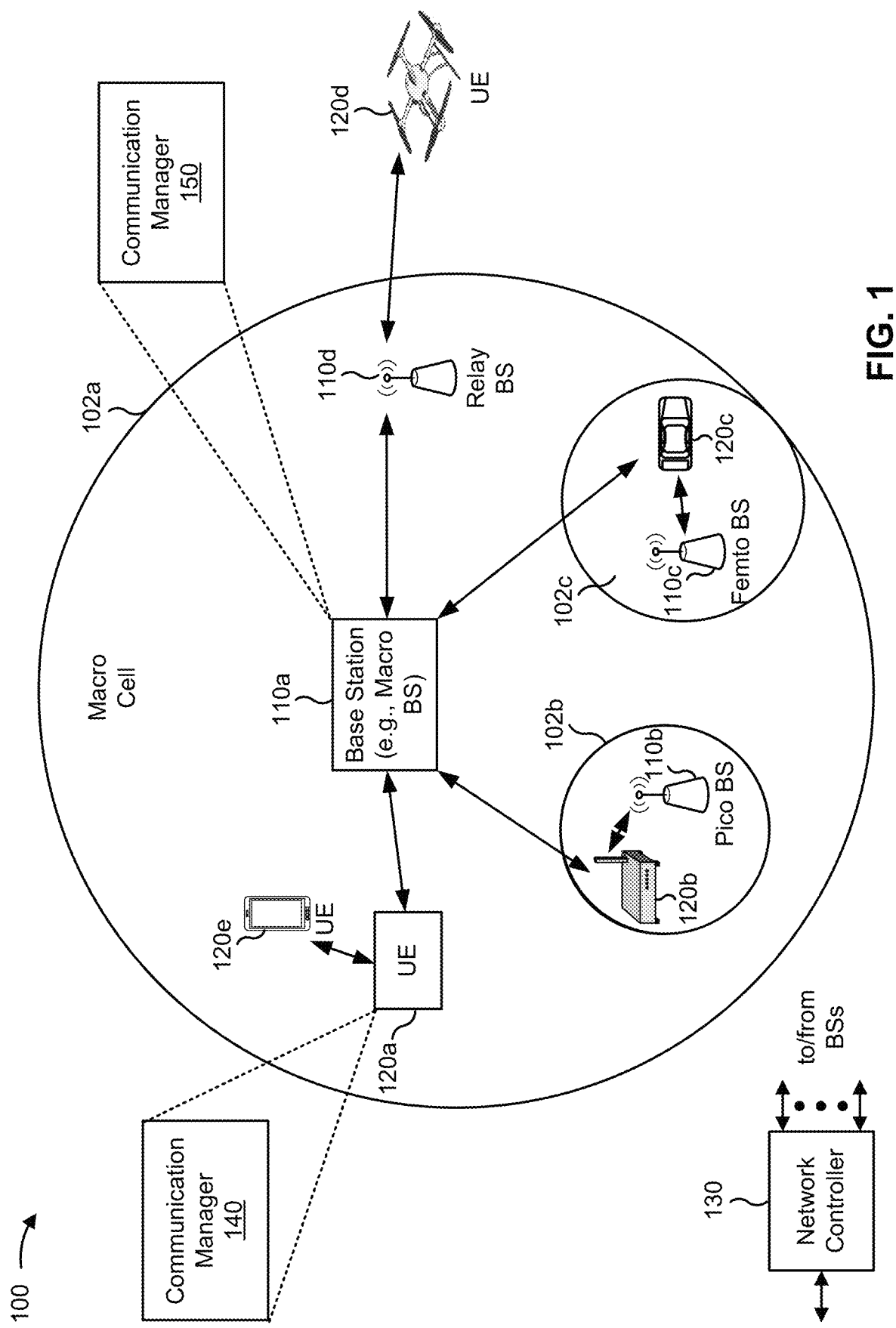
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Accordingly, as shown in FIG. 1, UE 120d is an unmanned aerial vehicle (UAV). In another example, UE 120c is a vehicle UE (e.g., configured to use a vehicle-to-everything (V2X) protocol, such as a vehicle-to-vehicle (V2V) protocol, a vehicle-to-infrastructure (V2I) protocol, and/or a vehicle-to-pedestrian (V2P) protocol). Some UEs 120 may be considered Internet-of-Things (IoT) devices (e.g., UE 120b is an IoT device as shown in FIG. 1), and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a V2X protocol, and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a plurality of densities associated with a phase-tracking reference signal (PT-RS) and may transmit (or receive), across a plurality of slots, wherein at least a first slot of the plurality of slots includes the PT-RS at a first density of the plurality of densities and a second slot of the plurality of slots includes the PT-RS at a second density of the plurality of densities. Additionally, or alternatively, the communication manager 140 may receive an indication of a non-uniform density associated with a PT-RS and may transmit (or receive), within a slot, wherein the slot includes the PT-RS at the non-uniform density across a plurality of symbols of the slot. Additionally, or alternatively, the communication manager 140 may perform one or more other operations described herein.

In some aspects, a network entity (e.g., the base station 110) may include a communication manager 150. As described in more detail elsewhere herein, the communication manager 150 may transmit an indication of a plurality of densities associated with a PT-RS and may receive (or transmit), across a plurality of slots, wherein at least a first slot of the plurality of slots includes the PT-RS at a first density of the plurality of densities and a second slot of the plurality of slots includes the PT-RS at a second density of the plurality of densities. Additionally, or alternatively, the communication manager 150 may transmit an indication of a non-uniform density associated with a PT-RS and may receive (or transmit), within a slot, wherein the slot includes the PT-RS at the non-uniform density across a plurality of symbols of the slot. Additionally, or alternatively, the communication manager 150 may perform one or more other operations described herein.

As indicated above, FIG. 1 is provided as an example. Other examples may differ from what is described with regard to FIG. 1.

Figure 2:
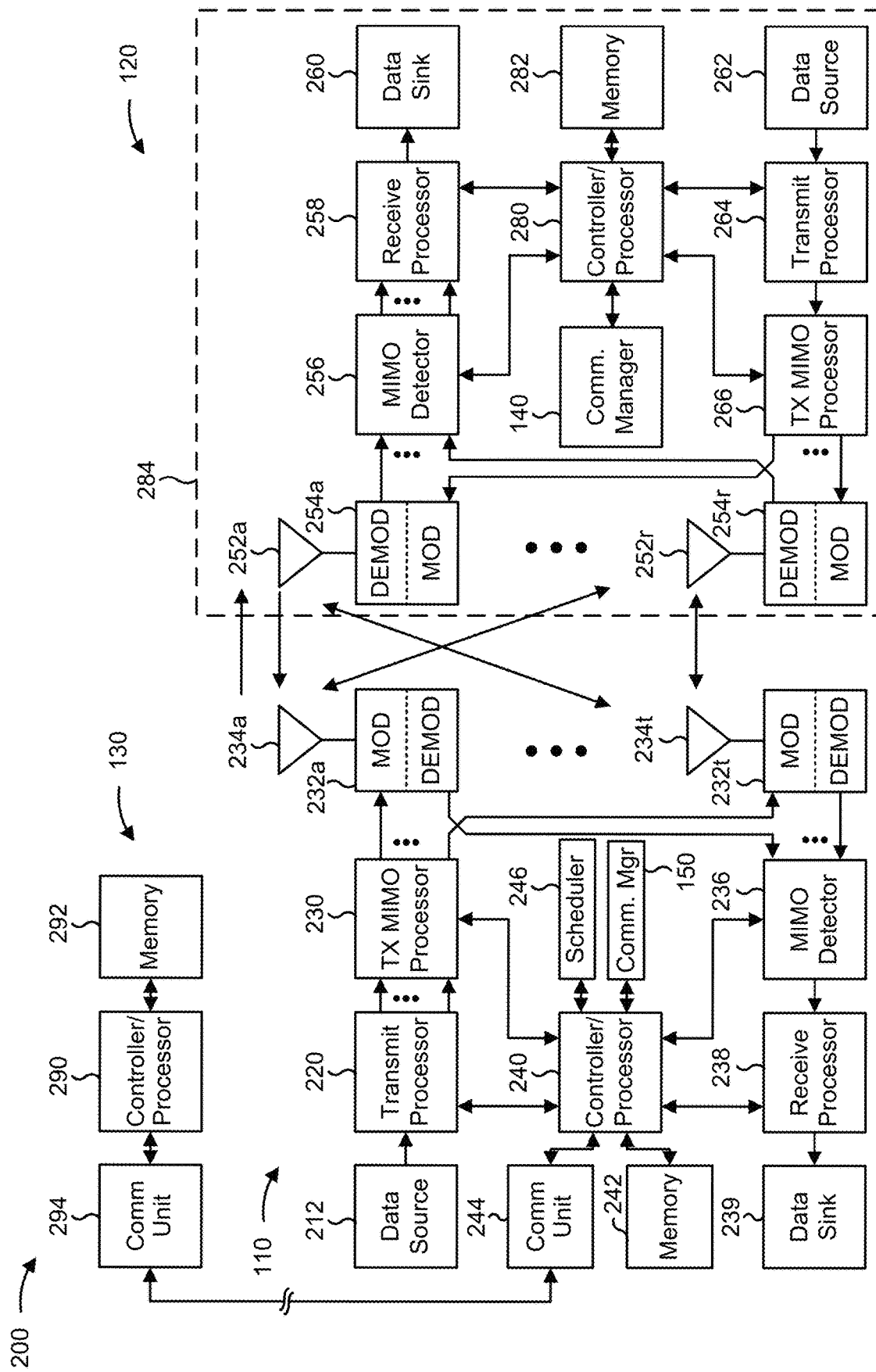
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the base station 110, the controller/processor 280 of the UE 120, and/or any other component(s) of FIG. 2 may perform one or more techniques associated with varying densities for PT-RSs, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples. In some aspects, the network entity described herein is the base station 110, is included in the base station 110, or includes one or more components of the base station 110 shown in FIG. 2.

In some aspects, a UE (e.g., UE 120 and/or apparatus 1200 of FIG. 12) may include means for receiving an indication of a plurality of densities associated with a PT-RS; and/or means for transmitting, or means for receiving, across a plurality of slots, wherein at least a first slot of the plurality of slots includes the PT-RS at a first density of the plurality of densities and a second slot of the plurality of slots includes the PT-RS at a second density of the plurality of densities. Additionally, or alternatively, the UE may include means for receiving an indication of a non-uniform density associated with a PT-RS; and/or means for transmitting, or means for receiving, within a slot, wherein the slot includes the PT-RS at the non-uniform density across a plurality of symbols of the slot. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 13:
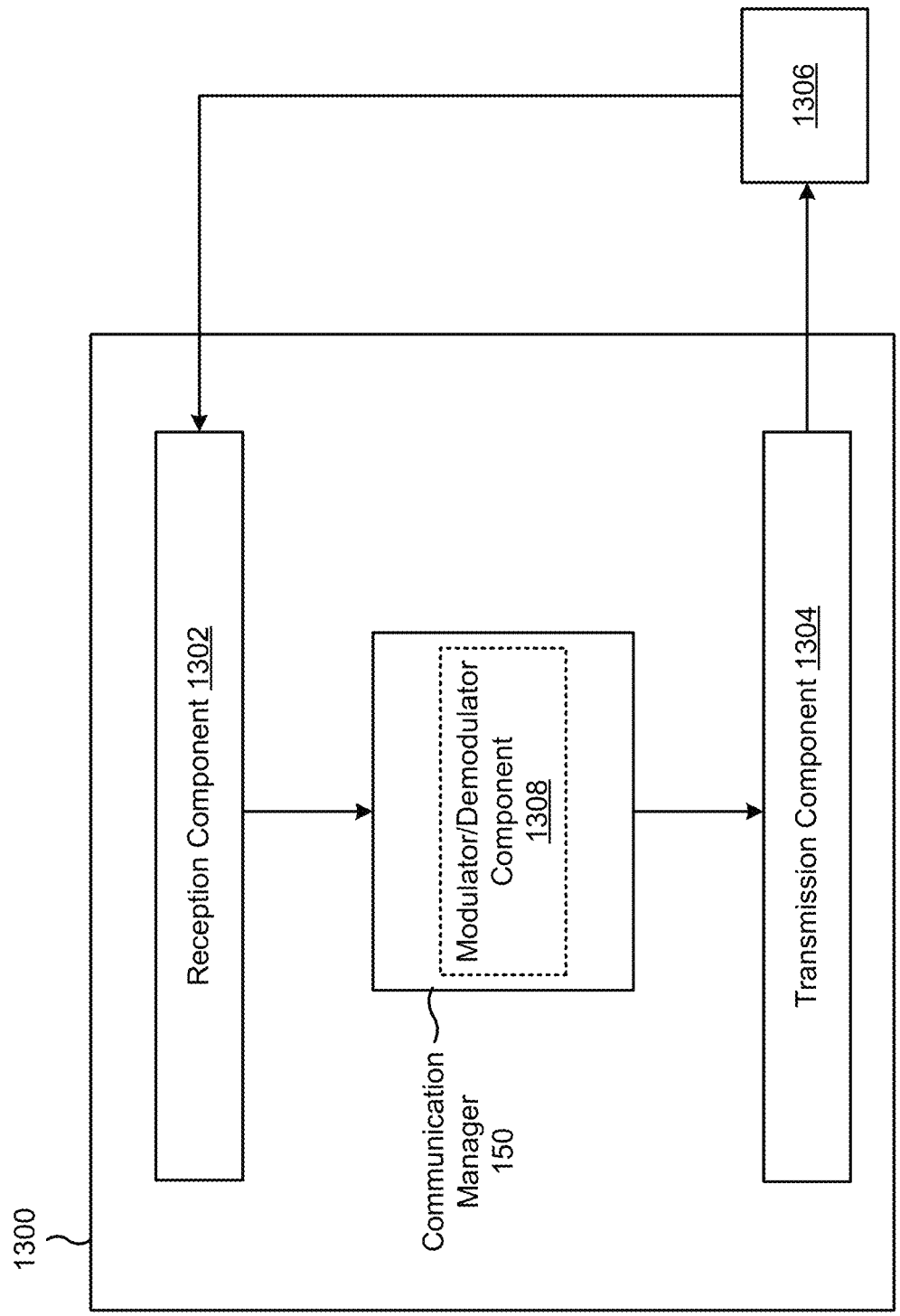

In some aspects, a network entity (e.g., base station 110, CU 310, DU 330, RU 340, and/or apparatus 1300 of FIG. 13) may include means for transmitting an indication of a plurality of densities associated with a PT-RS; and/or means for receiving, means for transmitting or transmitting, across a plurality of slots, wherein at least a first slot of the plurality of slots includes the PT-RS at a first density of the plurality of densities and a second slot of the plurality of slots includes the PT-RS at a second density of the plurality of densities. Additionally, or alternatively, the network entity may include means for transmitting an indication of a non-uniform density associated with a PT-RS; and/or means for receiving, or means for transmitting, within a slot, wherein the slot includes the PT-RS at the non-uniform density across a plurality of symbols of the slot. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
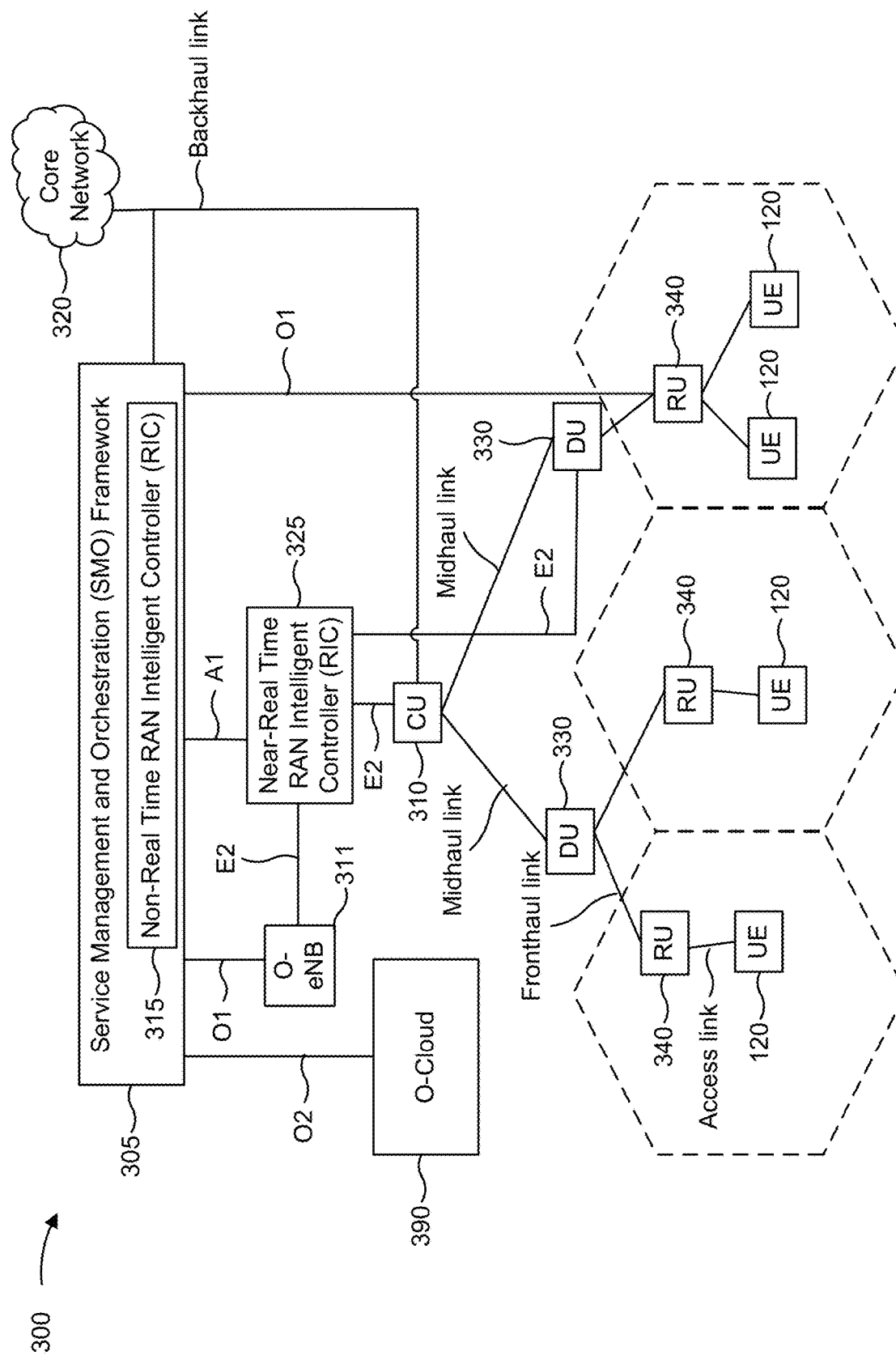
FIG. 3 is a diagram illustrating an example of disaggregated base station architecture, in accordance with the present disclosure.

FIG. 3 is a diagram illustrating an example 300 disaggregated base station architecture, in accordance with the present disclosure. Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
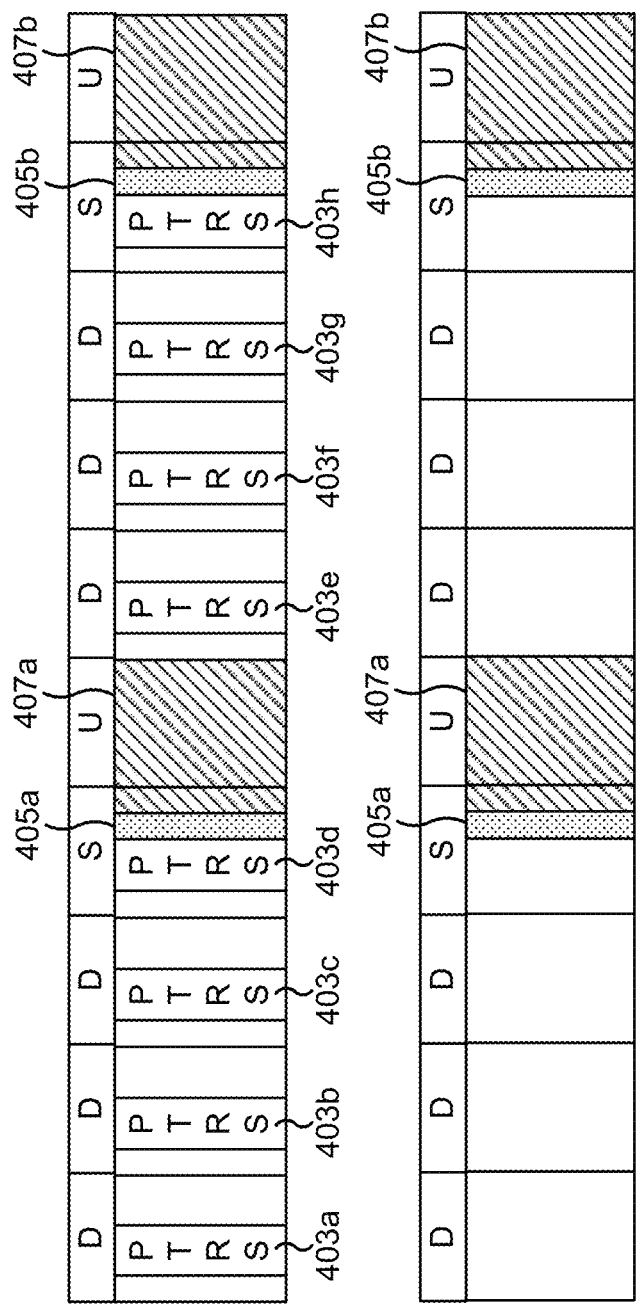
FIG. 4 is a diagram illustrating an example of configurations for phase-tracking reference signals (PT-RSs), in accordance with the present disclosure.

FIG. 4 is a diagram illustrating an example 400 of configurations for PT-RSs, in accordance with the present disclosure. Example 400 is a time domain duplex (TDD) configuration with 6 downlink slots (labeled "D"), 2 flexible slots (labeled "S"), and 2 uplink slots ("U") per subframe. As used herein, "slot" may refer to a portion of a subframe, which in turn may be a fraction of a radio frame within an LTE, 5G, or other wireless communication structure. In some aspects, a slot may include one or more symbols. Additionally, "symbol" may refer to an OFDM symbol or another similar symbol within a slot. Although described using 6 downlink slots, 2 flexible slots, and 2 uplink slots, other examples may include additional downlink slots (e.g., eleven slots, twelve slots, and so on) or fewer downlink slots (e.g., nine slots, eight slots, and so on), additional flexible slots (e.g., three slots, four slots, and so on) or fewer flexible slots (e.g., one slot or zero slots), and/or additional uplink slots (e.g., three slots, four slots, and so on) or fewer uplink slots (e.g., one slot or zero slots).

As shown in FIG. 4 and in pattern 401, a PT-RS may be configured with a uniform density in time (and also in frequency, such as across subcarriers) for downlink. Accordingly, the PT-RS instances 403a, 403b, 403c, 403d, 403e, 403f, 403g, and 403h may be uniformly distributed across slots. Additionally, within a slot, a PT-RS instance (e.g., instance 403a, 403b, 403c, 403d, 403e, 403f, 403g, or 403h) may be configured with a uniform density in time (e.g., periodic across symbols and included in same subcarriers for whichever symbols include the PT-RS). Although shown with reference to PT-RS instances for downlink, example 400 may similarly include PT-RS instances for uplink.

In example 400, pattern 401 further includes guard symbols 405a and 405b before uplink symbols 407a and 407b, respectively. The guard symbols 405a and 405b may allow a UE to reconfigure (e.g., by modifying settings of hardware components, such as antennas, modems, and other similar components) for transmitting data after receiving data.

By using pattern 401 for downlink, the UE may track a phase of signals from a network entity (e.g., an RU) more accurately, which increases quality and reliability of downlink reception. Similarly, for uplink, the network entity may track a phase of signals from the UE more accurately, which increases quality and reliability of uplink reception.

However, as shown in FIG. 4, the PT-RS reduces throughput because the PT-RS occupies subcarriers that could otherwise be used to encode data (or control information). Accordingly, as shown in FIG. 4 and in pattern 409, the PT-RS may be disabled to increase throughput. However, by using pattern 409, the UE may experience reduced reliability and quality of downlink reception because the PT-RS is not available to assist with phase tracking and thus demodulating of wireless signals. Similarly, for uplink, the network entity may experience reduced reliability and quality of uplink reception because the PT-RS is not available to assist with phase tracking and thus demodulating of wireless signals.

Some techniques and apparatuses described herein enable a network entity (e.g., network entity 501 of FIG. 5) to configure non-uniform density for a PT-RS across slots. As a result, a UE (e.g., UE 120) may experience increased throughput in slots where the PT-RS density is reduced along with increased quality and reliability in slots where the PT-RS density is increased. Similarly, for uplink, the network entity 501 may experience increased throughput in slots where the PT-RS density is reduced along with increased quality and reliability in slots where the PT-RS density is increased.

Additionally, or alternatively, some techniques and apparatuses described herein enable a network entity (e.g., network entity 501 of FIG. 5) to configure non-uniform density for a PT-RS across symbols. As a result, a UE (e.g., UE 120)

may experience increased throughput in symbols where the PT-RS density is reduced along with increased quality and reliability in symbols where the PT-RS density is increased. Similarly, for uplink, the network entity 501 may experience increased throughput in symbols where the PT-RS density is reduced along with increased quality and reliability in symbols where the PT-RS density is increased.

As indicated above, FIG. 4 is provided as an example. Other examples may differ from what is described with respect to FIG. 4.

Figure 5:
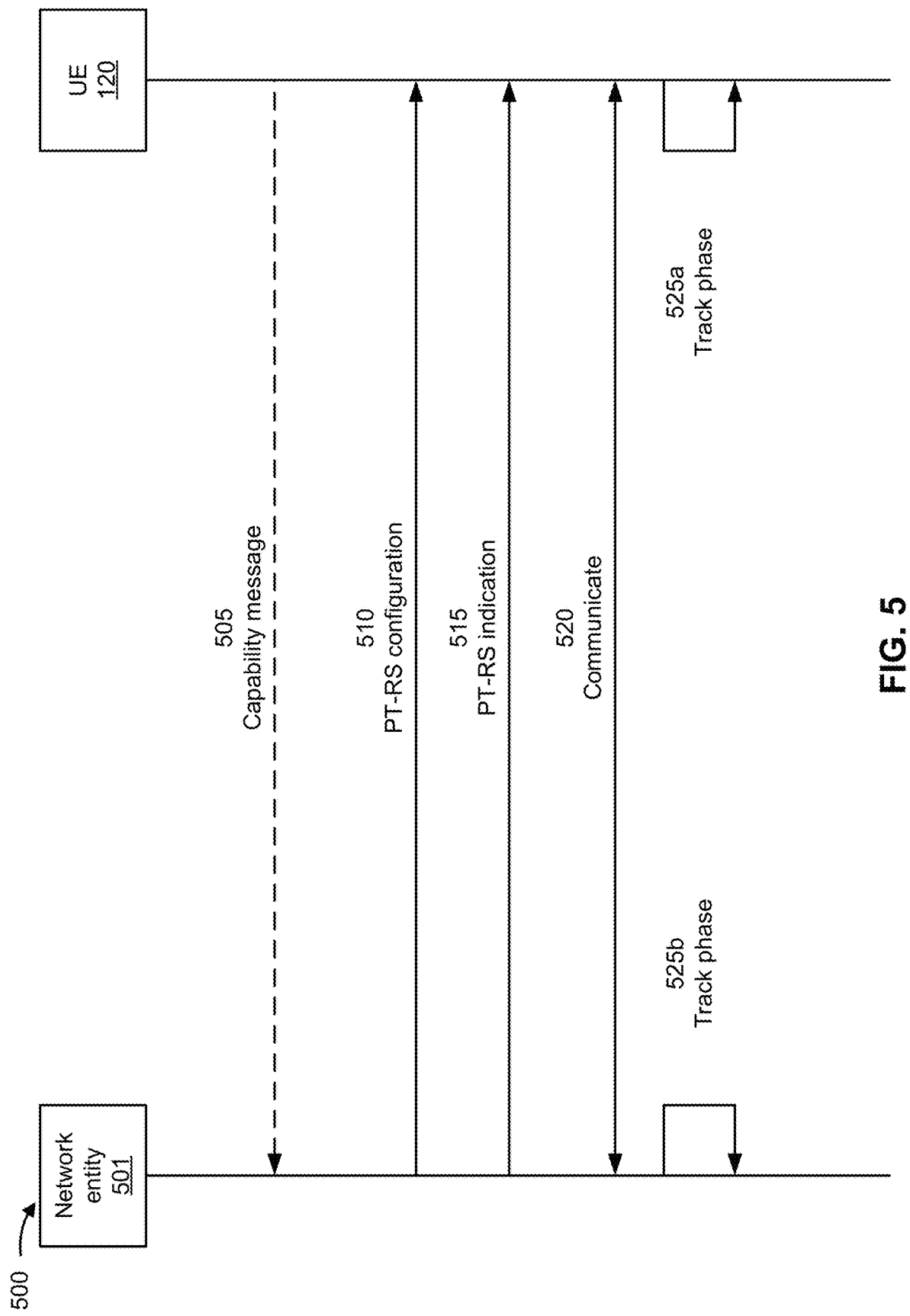
FIG. 5 is a diagram illustrating an example associated with varying densities for PT-RSs, in accordance with the present disclosure.

FIG. 5 is a diagram illustrating an example 500 associated with varying densities for PT-RSs, in accordance with the present disclosure. As shown in FIG. 5, a network entity 501 and a UE 120 may communicate with one another (e.g., on a wireless network, such as wireless network 100 of FIG. 1). In some aspects, the network entity 501 may include an RU 340 communicating wirelessly with the UE 120. Additionally, or alternatively, the network entity 501 may include a CU 310 and/or a DU 330 controlling the RU 340 that communicates wirelessly with the UE 120.

As shown by reference number 505, the UE 120 may transmit, and the network entity 501 may receive, a capability message. For example, the capability message may be a UECapabilityInformation message, as defined in 3GPP specifications and/or another standard. In some aspects, the network entity 501 may transmit, and the UE 120 may receive, a request such that the UE 120 transmits the capability message in response to the request. For example, the request may be a UECapabilityEnquiry message, as defined in 3GPP specifications and/or another standard.

The capability message may indicate one or more recommended densities for a PT-RS across slots. For example, the UE 120 may include indices corresponding to a table (or another similar relational data structure), where each index corresponds to a unique density (e.g., a periodicity in time, such as an L_PTRS variable measured in slots and/or symbols; a pattern in frequency, such as a K_PTRS variable, measured in subcarriers; or a combination thereof) in the table. In another example, the UE 120 may include one or more indices corresponding to a table (or another similar relational data structure), where each index corresponds to a sequence of densities to be applied across slots (e.g., a first L_PTRS to use in a first slot, a second L_PTRS to use in a second slot, and so on; a first K_PTRS to use in a first slot, a second K_PTRS to use in a second slot, and so on; or a combination thereof). The table may be configured by the network entity 501 (e.g., via RRC signaling, as described below in connection with reference number 510) and/or may be stored in a memory of the UE 120 (e.g., according to 3GPP specifications and/or another standard). In a combinatory example, the network entity 501 may select (e.g., via RRC signaling, as described below in connection with reference number 510) from a plurality of tables stored in a memory of the UE 120 (e.g., according to 3GPP specifications and/or another standard). In some aspects, the UE 120 may use aptrs-densityRecommendationSetDL data structure (e.g., to be defined in 3GPP specifications and/or another standard) to indicate recommended densities for downlink and/or aptrs-densityRecommendationSetUL data structure (e.g., to be defined in 3GPP specifications and/or another standard) to indicate recommended densities for uplink.

Additionally, or alternatively, the capability message may indicate a recommended non-uniform density for a PT-RS across symbols. For example, the UE 120 may include indices corresponding to a table (or another similar relational data structure), where each index corresponds to a unique density (e.g., a periodicity in time, such as an L_PTRS variable measured in symbols; a pattern in frequency, such as a K_PTRS variable, measured in subcarriers; or a combination thereof) in the table. In another example, the UE 120 may include one or more indices corresponding to a table (or another similar relational data structure), where each index corresponds to a non-uniform density to be applied within a slot (e.g., a first L_PTRS to use in a first set of symbols, a second L_PTRS to use in a second set of symbols, and so on; a first K_PTRS to use in a first set of symbols, a second K_PTRS to use in a second set of symbols, and so on; or a combination thereof). The table may be configured by the network entity 501 (e.g., via RRC signaling, as described below in connection with reference number 510) and/or may be stored in a memory of the UE 120 (e.g., according to 3GPP specifications and/or another standard). In a combinatory example, the network entity 501 may select (e.g., via RRC signaling, as described below in connection with reference number 510) from a plurality of tables stored in a memory of the UE 120 (e.g., according to 3GPP specifications and/or another standard). In some aspects, the UE 120 may use aptrs-densnyRecommendationSetDL data structure (e.g., to be defined in 3GPP specifications and/or another standard) to indicate a recommended non-uniform density for downlink and/or a ptrs-densnyRecommendationSetUL data structure (e.g., to be defined in 3GPP specifications and/or another standard) to indicate a recommended non-uniform density for uplink.

As shown by reference number 510, the network entity 501 may transmit, and the UE 120 may receive, a PT-RS configuration. For example, the PT-RS configuration may include an indication of a plurality of densities associated with a PT-RS. As described above, the indication may be included in an RRC message. For example, the network entity 501 may use a PTRS-DownlinkConfig data structure (e.g., to be defined in 3GPP specifications and/or another standard) to indicate a plurality of densities for downlink or a PTRS-UplinkConfig data structure (e.g., to be defined in 3GPP specifications and/or another standard) to indicate a plurality of densities for uplink.

Accordingly, as shown by reference number 515, the network entity 501 may transmit, and the UE 120 may receive, a PT-RS indication. For example, the PT-RS indication may activate one or more densities of the plurality of densities. In some aspects, the indication may be included in downlink control information (DCI) and/or a MAC control element (MAC-CE). In a combinatory example, the RRC message (described in connection with reference number 510) may include a table (or another similar relational data structure), and the DCI and/or MAC-CE may indicate the plurality of densities with reference to the table.

In some aspects, the network entity 501 may include the indication with a dynamic grant associated with the downlink (or uplink). Accordingly, the network entity 501 may ensure that the UE 120 will not attempt to decode downlink control information and/or data (or encode uplink control information and/or data) without using the PT-RS. For example, the network entity 501 may transmit the indication after a slot format indicator (SFI) associated with a slot used for the downlink (or uplink).

Additionally, or alternatively, the network entity 501 may transmit, and the UE 120 may receive, an indication of a non-uniform density associated with a PT-RS. As described above, the indication may be included in an RRC message. For example, the network entity 501 may use a PTRS-DownlinkConfig data structure (e.g., to be defined in 3GPP specifications and/or another standard) to indicate a non-uniform density for downlink or a PTRS-UplinkConfig data structure (e.g., to be defined in 3GPP specifications and/or another standard) to indicate a non-uniform density for uplink. Additionally, or alternatively, the indication may be included in DCI and/or a MAC-CE. In a combinatory example, the RRC message may include a table (or another similar relational data structure), and the DCI and/or MAC-CE may indicate the plurality of densities with reference to the table.

In some aspects, the network entity 501 may include the indication with a dynamic grant associated with the downlink (or uplink). Accordingly, the network entity 501 may ensure that the UE 120 will not attempt to decode downlink control information and/or data (or encode uplink control information and/or data) without using the PT-RS. For example, the network entity 501 may transmit the indication after an SFI associated with a slot used for the downlink (or uplink).

As shown by reference number 520, the network entity 501 may transmit, and the UE 120 may receive, across a plurality of slots. A first slot of the plurality of slots may include the PT-RS at a first density of the plurality of densities, and a second slot of the plurality of slots may include the PT-RS at a second density of the plurality of densities. For example, a smaller density may be used for downlink slots further from an uplink slot than for downlink slots closer to the uplink slot, as described in connection with FIG. 6A. Additionally, or alternatively, a smaller density may be used for downlink slots further from a slot including a DMRS than for downlink slots closer to the slot including the DMRS, as described in connection with FIG. 6B.

Similarly for uplink, the UE 120 may transmit, and the network entity 501 may receive, across a plurality of slots. A first slot of the plurality of slots may include the PT-RS at a first density of the plurality of densities, and a second slot of the plurality of slots may include the PT-RS at a second density of the plurality of densities. For example, a smaller density may be used for uplink slots further from a downlink slot than for uplink slots closer to the downlink slot.

Additionally, or alternatively, the network entity 501 may transmit, and the UE 120 may receive, within a slot that includes the PT-RS at the non-uniform density across a plurality of symbols of the slot. For example, the non-uniform density may be greater for one or more symbols, of the plurality of symbols, closer to a start of the slot, than for one or more additional symbols, of the plurality of symbols, closer to an end of the slot, as described in connection with FIGS. 7A-7C.

Similarly for uplink, the UE 120 may transmit, and the network entity 501 may receive, within a slot that includes the PT-RS at the non-uniform density across a plurality of symbols of the slot. For example, the non-uniform density may be greater for one or more symbols, of the plurality of symbols, closer to a start of the slot, than for one or more additional symbols, of the plurality of symbols, closer to an end of the slot.

For downlink, and as shown by reference number 525a, the UE 120 may track a phase of wireless signals from the network entity 501 using the PT-RS. Similarly, for uplink, and as shown by reference number 525b, the network entity 501 may track a phase of wireless signals from the UE 120 using the PT-RS.

By using techniques as described in connection with FIG. 5, the network entity 501 may configure non-uniform density for a PT-RS across slots and/or symbols. As a result, for downlink, the UE 120 experiences increased throughput whenever the PT-RS density is reduced along with increased quality and reliability whenever the PT-RS density is increased. Similarly, for uplink, the network entity 501 experiences increased throughput whenever the PT-RS density is reduced along with increased quality and reliability whenever the PT-RS density is increased.

As indicated above, FIG. 5 is provided as an example. Other examples may differ from what is described with respect to FIG. 5.

Figure 6A:
FIGS. 6A and 6B are diagrams illustrating examples associated with varying densities for PT-RSs across slots, in accordance with the present disclosure.

FIG. 6A is a diagram illustrating an example 600 associated with varying densities for PT-RSs across slots, in accordance with the present disclosure. Example 600 is a TDD configuration with 6 downlink slots (labeled "D"), 2 flexible slots (labeled "S"), and 2 uplink slots ("U") per subframe. Although described using 6 downlink slots, 2 flexible slots, and 2 uplink slots, other examples may include additional downlink slots (e.g., seven slots, eight slots, and so on) or fewer downlink slots (e.g., five slots, four slots, and so on), additional flexible slots (e.g., three slots, four slots, and so on) or fewer flexible slots (e.g., one slot or zero slots), and/or additional uplink slots (e.g., three slots, four slots, and so on) or fewer uplink slots (e.g., one slot or zero slots). The TDD configuration may be used between a UE 120 and a network entity 501.

As shown in FIG. 6A, some slots are associated with greater PT-RS densities than other slots. For example, the slots in FIG. 6A use four different PT-RS densities (in time, in frequency, or both). Accordingly, slots 0 and 5 include the PT-RS at a greatest density, slots 1 and 6 include the PT-RS at a second-greatest density, slots 2 and 7 include the PT-RS at a second-smallest density, and slots 3 and 8 include the PT-RS at a smallest density. Accordingly, in example 600, the PT-RS is denser in slots closer to uplink slots 4 and 9 and less dense in slots further from uplink slots 4 and 9. In some aspects, the PT-RS may even be disabled in slots further from uplink slots 4 and 9. For example, the density in slots 3 and 8 may be zero. Therefore, the UE 120 experiences a reduced block error rate (BLER) when switching from uplink to downlink by using the PT-RS for phase tracking while experiencing increased throughput in subsequent slots. Although described in connection with four different densities, the description similarly applies to fewer densities across slots (e.g., three different densities or two different densities) or additional densities across slots (e.g., five different densities, six different densities, and so on).

As described in connection with FIG. 5, the densities used in example 600 may be indicated via RRC, DCI, and/or MAC-CE. For example, the network entity 501 may indicate the densities to be used in one or more dynamic grants associated with the slots. Additionally, or alternatively, the network entity 501 may indicate the densities for slots 3 and 8 after transmitting SFIs associated with the slots.

Although shown with respect to downlink, example 600 similarly may apply to uplink. For example, the different uplink slots may include a PT-RS at different densities. Accordingly, the PT-RS may be denser in slots closer to a downlink slot and less dense in slots further from the downlink slot. In some aspects, the PT-RS may even be disabled in slots further from the downlink slot. Therefore, the UE 120 experiences a reduced BLER when switching from downlink to uplink by providing the PT-RS to the network entity 501 while experiencing increased throughput in subsequent slots.

Figure 6B:

FIG. 6B is a diagram illustrating an example 650 associated with varying densities for PT-RSs across slots, in accordance with the present disclosure. Example 650 is a TDD configuration with 7 downlink slots (labeled "D"), 1 flexible slots (labeled "S"), and 2 uplink slots ("U") per subframe. Although described using 7 downlink slots, 1 flexible slots, and 2 uplink slots, other examples may include additional downlink slots (e.g., eight slots, nine slots, and so on) or fewer downlink slots (e.g., six slots, five slots, and so on), additional flexible slots (e.g., two slots, three slots, and so on) or fewer flexible slots (e.g., zero slots), and/or additional uplink slots (e.g., three slots, four slots, and so on) or fewer uplink slots (e.g., one slot or zero slots). The TDD configuration may be used between a UE 120 and a network entity 501.

As shown in FIG. 6B, some slots are associated with greater PT-RS densities than other slots. For example, the slots in FIG. 6B use three different PT-RS densities (in time, in frequency, or both). Accordingly, slot 2 includes the PT-RS at a smallest density, slot 4 includes the PT-RS at a middle density, and slot 6 includes the PT-RS at a greatest density. Accordingly, in example 650, the PT-RS is denser in slots closer to slot 0 that includes a DMRS and less dense in slots further from slot 0. In some aspects, the PT-RS may be periodic (e.g., every 2 slots in example 650) according to an offset after the DMRS (e.g., an offset of 2 slots in example 650). Although described in slots, the periodicity and/or the offset may be configured at the symbol level. Therefore, the UE 120 experiences a reduced BLER when further from the DMRS by using the PT-RS for phase tracking while experiencing increased throughput in slots without the PT-RS and in slots closer to the DMRS. Although described in connection with three different densities, the description similarly applies to fewer densities across slots (e.g., two different densities) or additional densities across slots (e.g., four different densities, five different densities, and so on).

As described in connection with FIG. 5, the densities used in example 650 may be indicated via RRC, DCI, and/or MAC-CE. For example, the network entity 501 may indicate the densities to be used in one or more dynamic grants associated with the slots.

Although shown with respect to downlink, example 650 similarly may apply to uplink. For example, the different uplink slots may include a PT-RS at different densities. Accordingly, the PT-RS may be denser in slots further from a slot including a DMRS and less dense in slots closer to the slot including the DMRS. Therefore, the UE 120 experiences a reduced BLER when further from the DMRS by providing the PT-RS to the network entity 501 while experiencing increased throughput in slots without the PT-RS and in slots closer to the DMRS.

By using techniques as described in connection with FIGS. 6A and 6B, the network entity 501 configures a non-uniform density for the PT-RS across slots. As a result, the UE 120 experiences increased throughput in slots where the PT-RS density is reduced (e.g., slots 2, 3, 7, and 8 in example 600 or slots 0, 1, 3, 5, and 7 in example 650) along with increased quality and reliability in slots where the PT-RS density is increased (e.g., slots 0, 1, 5, and 6 in example 600 or slots 2, 4, and 6 in example 650). Similarly, for uplink, the network entity 501 may experience increased throughput in slots where the PT-RS density is reduced along with increased quality and reliability in slots where the PT-RS density is increased.

As indicated above, FIGS. 6A and 6B are provided as examples. Other examples may differ from what is described with respect to FIGS. 6A and 6B.

Figure 7A:
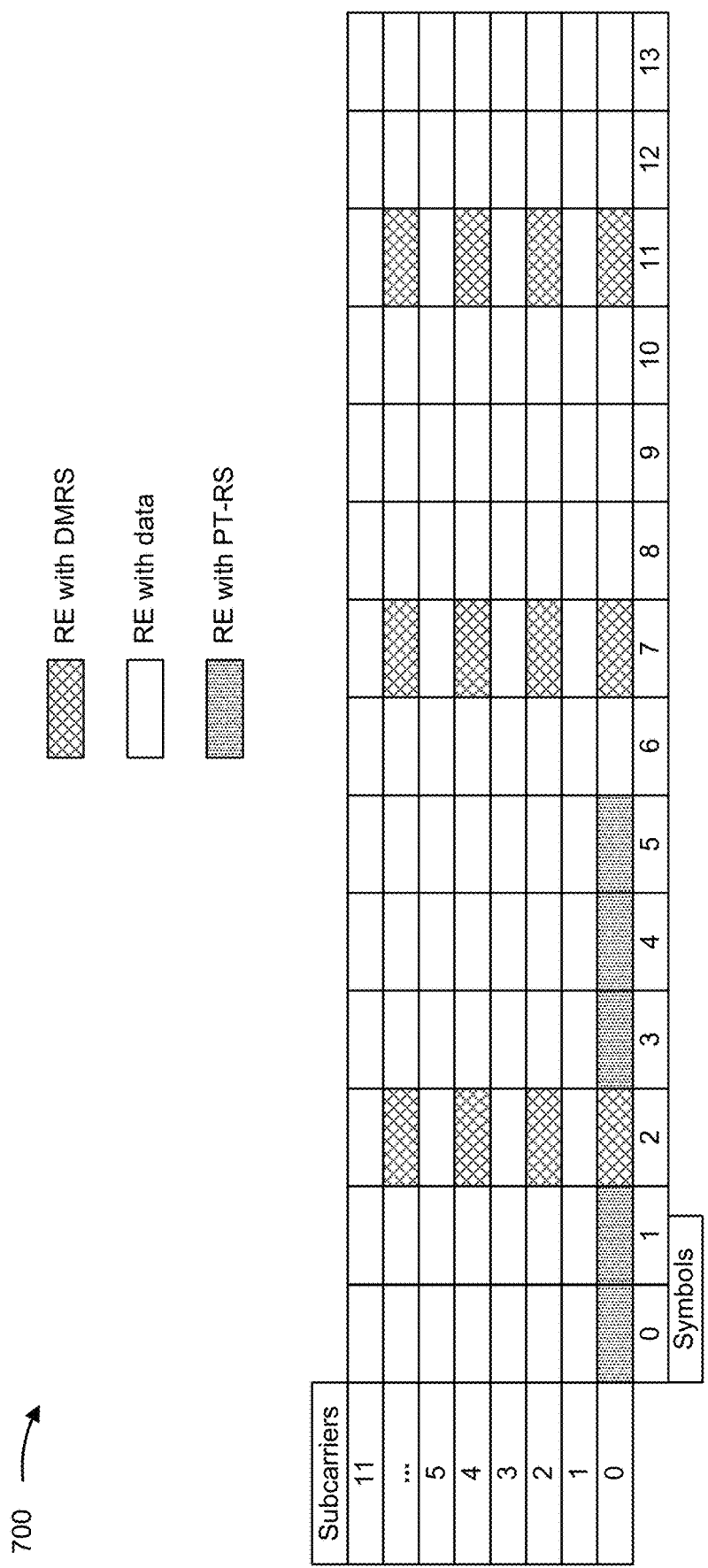
FIGS. 7A, 7B, and 7C are diagrams illustrating examples associated with varying densities for PT-RSs across symbols, in accordance with the present disclosure.
Figure 7B:
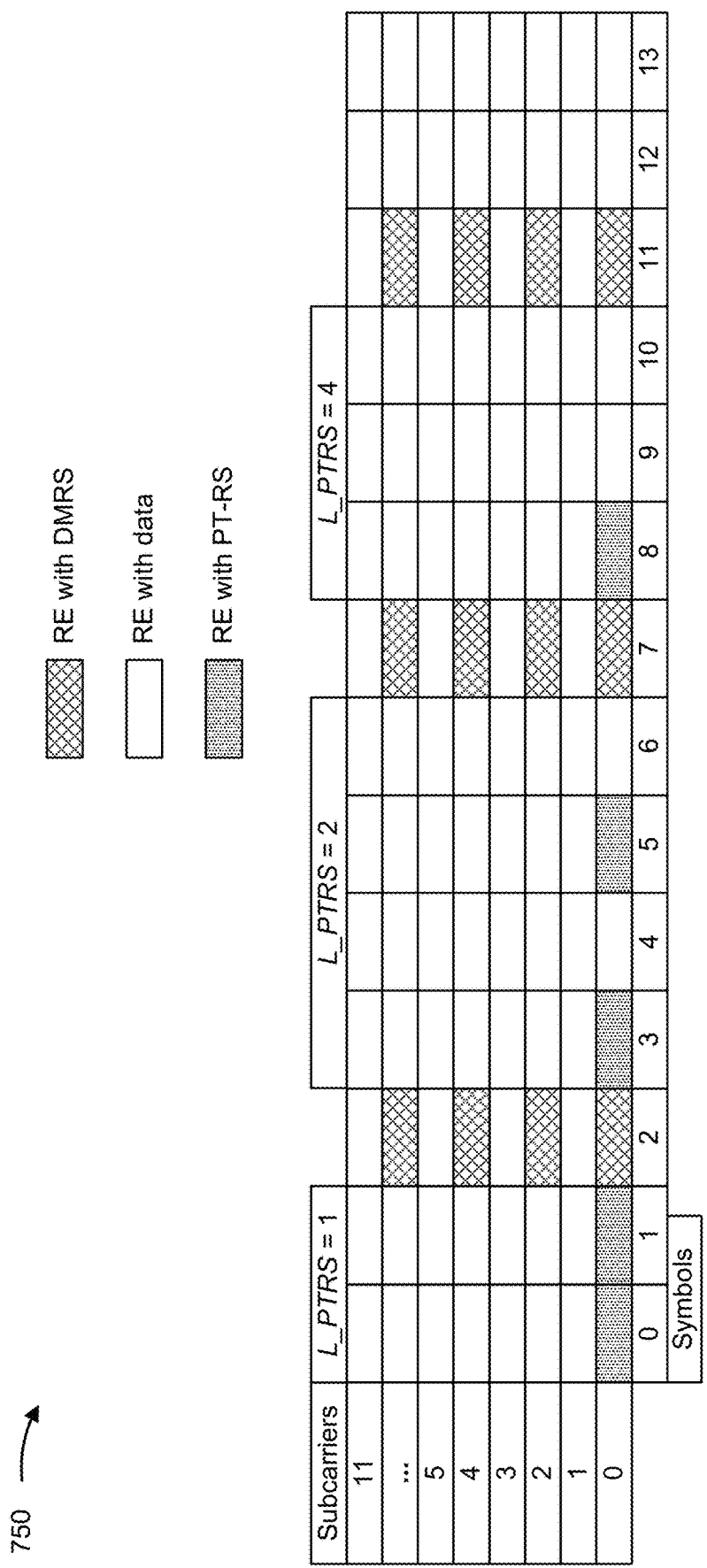
Figure 7C:

FIGS. 7A, 7B, and 7C are diagrams illustrating examples 700, 750, and 770, respectively, associated with varying densities for PT-RSs across symbols, in accordance with the present disclosure. Example 700 is a TDD configuration for a slot, such as a downlink slot or a flexible slot configured for downlink. Although described using 14 symbols in the slot, other examples may include additional symbols (e.g., fifteen symbols, sixteen symbols, and so on) or fewer downlink slots (e.g., thirteenth symbols, twelve symbols, and so on). Additionally, although described as including only downlink symbols, the slot may alternatively include at least one uplink symbol. The TDD configuration may be used between a UE 120 and a network entity 501.

As shown in FIG. 7A, resource elements (REs) of the slot include the PT-RS at a non-uniform density across a plurality of symbols of the slot. Each RE may include one symbol and one subcarrier. A "subcarrier" may refer to a frequency based at least in part on a "carrier" frequency, and subcarriers may be aggregated to convey information wirelessly (e.g., using OFDM symbols and/or other RF symbols).

Accordingly, the PT-RS may be denser in symbols closer to a start of the slot and less dense in symbols closer to an end of the slot. In some aspects, the PT-RS may even be disabled in symbols further from the start. Therefore, the UE 120 experiences a reduced BLER when switching from uplink to downlink by using the PT-RS for phase tracking while experiencing increased throughput in subsequent symbols.

Therefore, in example 700, the PT-RS has a frequency density of 1 (e.g., K_PTRS=1 subcarrier) and a time density of 1 (e.g., L_PTRS=1 and thus is included in every symbol, excluding symbols with a DMRS). However, the PT-RS is enabled only for five symbols and then is disabled (i.e., is configured with a time density of 0 and a frequency density of 0). Accordingly, after skipping symbol 2 (which includes the DMRS), the network entity 501 stops encoding the PT-RS after symbol 5. Other examples may include the PT-RS for additional symbols (e.g., six symbols, seven symbols, and so on) or fewer symbols (e.g., four symbols, three symbols, and so on). Additionally, or alternatively, the PT-RS may be included in more subcarriers (e.g., K_PTRS>1) and/or may be spread further in time (e.g., L_PTRS>1) when enabled. Although described as enabled and then disabled, the PT-RS may be included at different densities across the slot (e.g., a first density for the first five symbols, a second, smaller density for the next five symbols, and so on). One example of changing densities across the slot is shown in FIG. 7B.

As shown in FIG. 7B, REs of the slot include the PT-RS at a non-uniform density across a plurality of symbols of the slot. Accordingly, the PT-RS may be denser in symbols closer to a start of the slot and less dense in symbols closer to an end of the slot. In some aspects, the PT-RS may even be disabled in symbols further from the start. Therefore, the UE 120 experiences a reduced BLER when switching from uplink to downlink by using the PT-RS for phase tracking while experiencing increased throughput in subsequent symbols.

Therefore, in example 750, the PT-RS has a frequency density of 1 (e.g., K_PTRS=1 subcarrier) and a time density of 1 (e.g., L_PTRS=1). However, the density of the PT-RS is reduced after each DMRS. For example, the periodicity is increased to 2 (e.g., L_PTRS=2) after a first DMRS. Additionally, or alternatively, the frequency density may be decreased after the first DMRS. Subsequently, the periodicity is increased to 4 (e.g., L_PTRS=4) after a second DMRS. The periodicity may be increased after each DMRS instance until a maximum periodicity (e.g., a maximum of L_PTRS=4 in example 750). Other examples may increase the periodicity more slowly after each DMRS (e.g., linearly rather than exponentially) or more quickly after each DMRS (e.g., cubically rather than quadratically). Additionally, or alternatively, the PT-RS may be included in more subcarriers (e.g., K_PTRS>1) and/or may be spread further in time (e.g., L_PTRS>1) at a start of the slot. Although described as enabled with a decreasing density, the PT-RS may be disabled after a quantity of symbols or DMRS instances (e.g., disabled after four symbols in example 750 or disabled after two DMRS instances in example 750).

As shown in FIG. 7C, only a portion of the slot is allocated for downlink. In example 770, seven of the fourteen symbols are allocated for downlink, but other examples may include additional symbols (e.g., eight symbols, nine symbols, and so on) or fewer symbols (e.g., six symbols, five symbols, and so on) allocated for downlink.

Therefore, in example 770, the PT-RS has a frequency density of 1 (e.g., K_PTRS=1 subcarrier) and a time density of 1 (e.g., L_PTRS=1). Because only one instance of a DMRS is included in the slot, the periodicity is not increased after the DMRS such that the PT-RS is included in each symbol of the slot. Additionally, or alternatively, the frequency density may be kept the same after the DMRS. Therefore, the UE 120 experiences a reduced BLER when only a portion of a slot is dedicated to by using the PT-RS for phase tracking.

As described in connection with FIG. 5, the non-uniform density of example 700, example 750, or example 770 may be indicated via RRC, DCI, and/or MAC-CE. For example, the network entity 501 may indicate the non-uniform density to be used in a dynamic grant associated with the slot. Additionally, or alternatively, the network entity 501 may indicate the non-uniform density along with an SFI associated with the slot.

Although shown with respect to downlink, examples 700, 750, and 770 similarly may apply to uplink. For example, the UE 120 may include the PT-RS in REs of the slot at a non-uniform density. Accordingly, the PT-RS may be denser in symbols closer to a start of the slot and less dense in symbols closer to an end of the slot. In some aspects, the PT-RS may even be disabled in symbols further from the start. Therefore, the UE 120 experiences a reduced BLER when switching from downlink to uplink by providing the PT-RS to the network entity 501 while experiencing increased throughput in subsequent symbols.

By using techniques as described in connection with FIGS. 7A-7C, the network entity 501 configures a non-uniform density for the PT-RS across symbols. As a result, the UE 120 experiences increased throughput in symbols where the PT-RS density is reduced (e.g., symbols 6 through 13 in example 700 and symbols 5 through 13 in example 750) along with increased quality and reliability in symbols where the PT-RS density is increased (e.g., symbols 0, 1, 3, 4, and 5 in example 700, symbols 0, 1, 3, and 4 in example 750, and symbols 0 through 6 in example 770). Similarly, for uplink, the network entity 501 experiences increased throughput in symbols where the PT-RS density is reduced along with increased quality and reliability in symbols where the PT-RS density is increased.

In some aspects, example 700, example 750, or example 770 may be combined with example 600. For example, one or more slots in example 600 may include the PT-RS with a non-uniform density across symbols, as described for example 700, example 750, and example 770.

As indicated above, FIGS. 7A-7C are provided as examples. Other examples may differ from what is described with respect to FIGS. 7A-7C.

Figure 8:
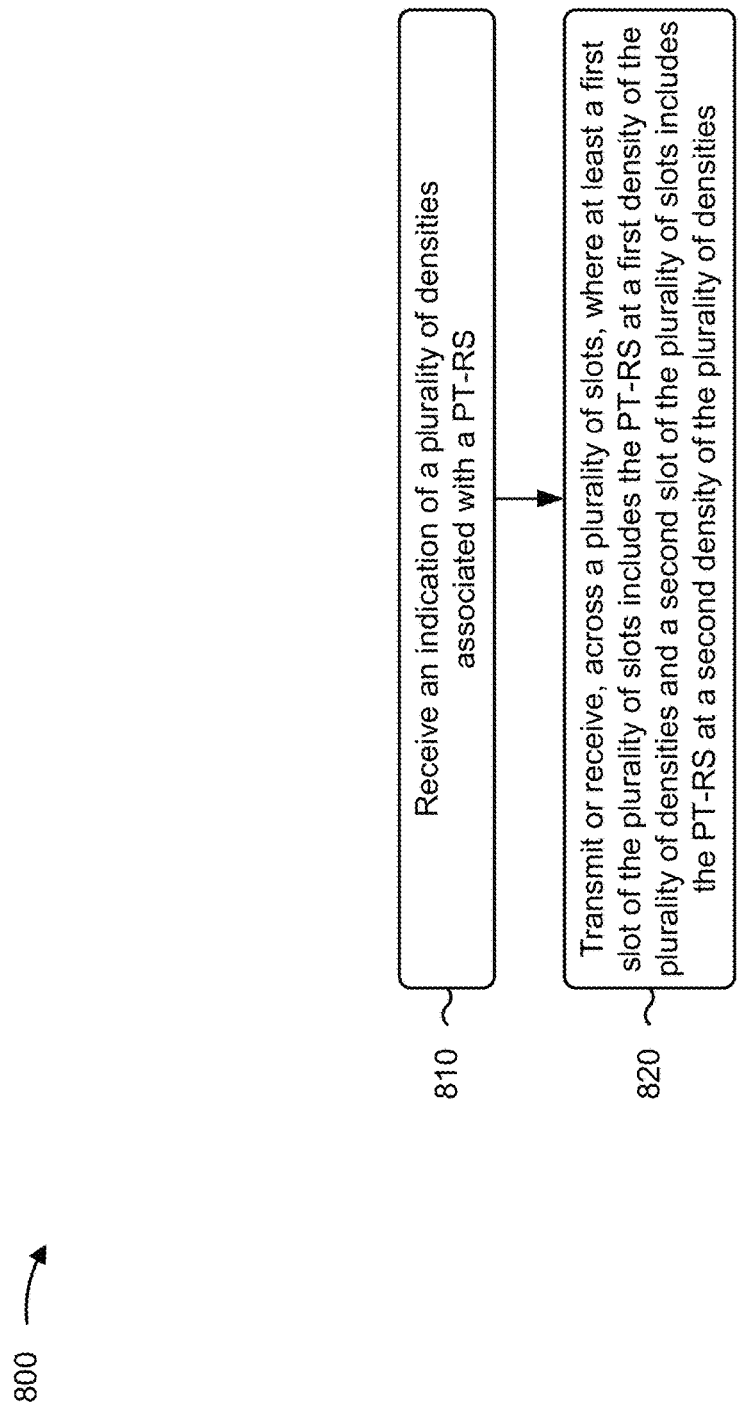
FIGS. 8, 9, 10, and 11 are diagrams illustrating example processes associated with varying densities for PT-RSs, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1200 of FIG. 12) performs operations associated with varying densities for PT-RSs.

As shown in FIG. 8, in some aspects, process 800 may include receiving an indication of a plurality of densities associated with a PT-RS (block 810). For example, the UE (e.g., using communication manager 140 and/or reception component 1202, depicted in FIG. 12) may receive an indication of a plurality of densities associated with a PT-RS, as described above in connection with FIGS. 5, 6, 7A, and 7B.

In some aspects, the indication is included in an RRC message. Additionally, or alternatively, an indication to activate the first density and the second density is included in DCI, a MAC-CE, or a combination thereof. The indication to activate the first density and the second density may be included in a dynamic grant associated with the first slot, the second slot, or a combination thereof. For example, the indication to activate the first density and the second density may be received after an SFI associated with the first slot, the second slot, or a combination thereof.

As further shown in FIG. 8, in some aspects, process 800 may include transmitting or receiving, across a plurality of slots, where at least a first slot of the plurality of slots includes the PT-RS at a first density of the plurality of densities and a second slot of the plurality of slots includes the PT-RS at a second density of the plurality of densities (block 820). For example, the UE (e.g., using communication manager 140, transmission component 1204, and/or reception component 1202, depicted in FIG. 12) may transmit or receive, across a plurality of slots, where at least a first slot of the plurality of slots includes the PT-RS at a first density of the plurality of densities and a second slot of the plurality of slots includes the PT-RS at a second density of the plurality of densities, as described above in connection with FIGS. 5, 6, 7A, and 7B.

In some aspects, the plurality of densities includes a plurality of frequency densities, a plurality of time densities, or a combination thereof. In one example, the first density is greater than the second density, and the first slot is closer to an uplink slot than the second slot. Additionally, or alternatively, the second density is zero. Additionally, or alternatively, the first density is a non-uniform density across a plurality of symbols of the first slot.

Process 800 may include additional aspects, such as any single aspect or any combination of aspects described below and/or in connection with one or more other processes described elsewhere herein.

In one aspect, process 800 further includes transmitting (e.g., using communication manager 140 and/or transmission component 1204) a capability message indicating one or more recommended densities, where the indication of the plurality of densities is based on the one or more recommended densities.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
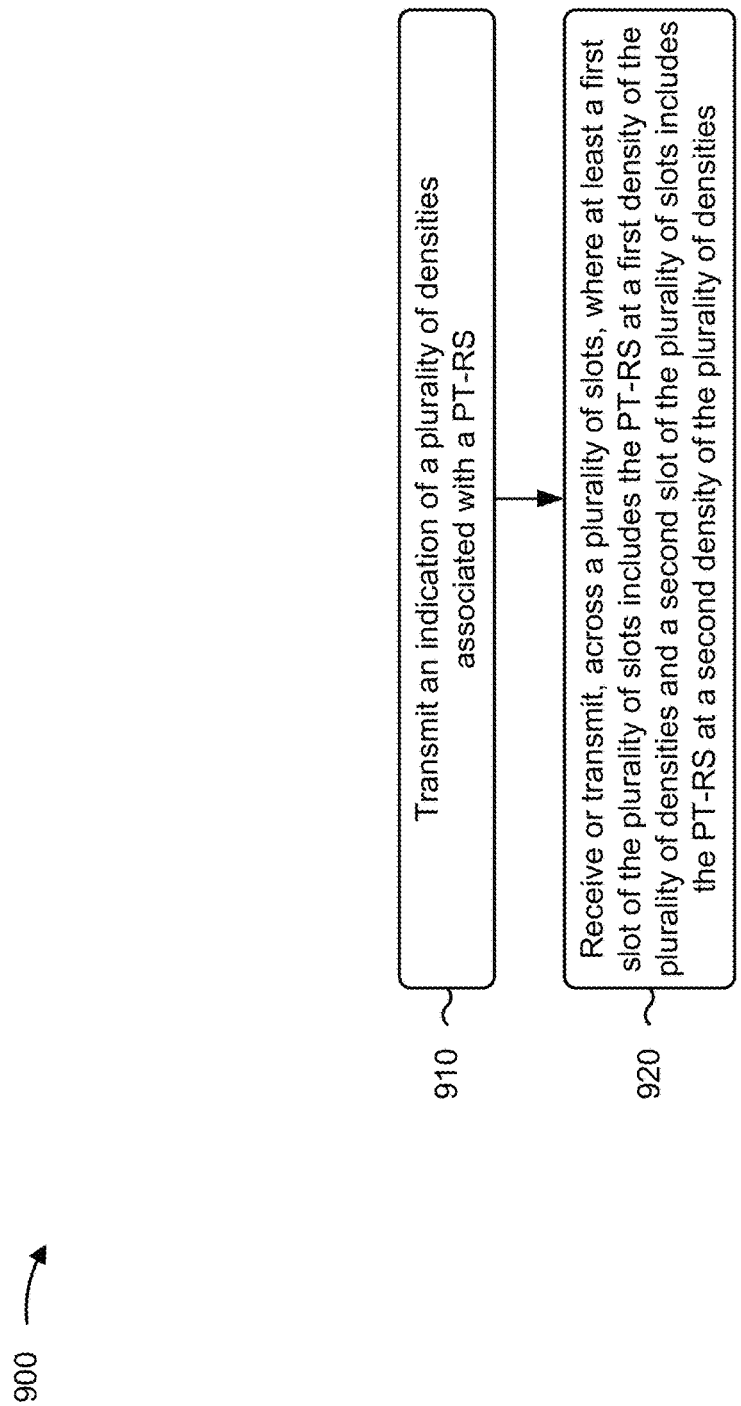

FIG. 9 is a diagram illustrating an example process 900 performed, for example, by a network entity, in accordance with the present disclosure. Example process 900 is an example where the network entity (e.g., network entity 501 and/or apparatus 1300 of FIG. 13) performs operations associated with varying densities for PT-RSs.

As shown in FIG. 9, in some aspects, process 900 may include transmitting an indication of a plurality of densities associated with a PT-RS (block 910). For example, the network entity (e.g., using communication manager 150 and/or transmission component 1304, depicted in FIG. 13) may transmit an indication of a plurality of densities associated with a PT-RS, as described above in connection with FIGS. 5, 6, 7A, and 7B.

In some aspects, the indication is included in an RRC message. Additionally, or alternatively, an indication to activate the first density and the second density is included in DCI, a MAC-CE, or a combination thereof. The indication to activate the first density and the second density may be included in a dynamic grant associated with the first slot, the second slot, or a combination thereof. For example, the indication to activate the first density and the second density may be transmitted after an SFI associated with the first slot, the second slot, or a combination thereof.

As further shown in FIG. 9, in some aspects, process 900 may include receiving or transmitting, across a plurality of slots, where at least a first slot of the plurality of slots includes the PT-RS at a first density of the plurality of densities and a second slot of the plurality of slots includes the PT-RS at a second density of the plurality of densities (block 920). For example, the network entity (e.g., using communication manager 150, reception component 1302, and/or transmission component 1304, depicted in FIG. 13) may receive or transmit, across a plurality of slots, where at least a first slot of the plurality of slots includes the PT-RS at a first density of the plurality of densities and a second slot of the plurality of slots includes the PT-RS at a second density of the plurality of densities, as described above in connection with FIGS. 5, 6, 7A, and 7B.

In some aspects, the plurality of densities includes a plurality of frequency densities, a plurality of time densities, or a combination thereof. In one example, the first density is greater than the second density, and the first slot is closer to an uplink slot than the second slot. Additionally, or alternatively, the second density is zero. Additionally, or alternatively, the first density is a non-uniform density across a plurality of symbols of the first slot.

Process 900 may include additional aspects, such as any single aspect or any combination of aspects described below and/or in connection with one or more other processes described elsewhere herein.

In one aspect, process 900 further includes receiving (e.g., using communication manager 150 and/or reception component 1302) a capability message indicating one or more recommended densities, where the indication of the plurality of densities is based on the one or more recommended densities.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
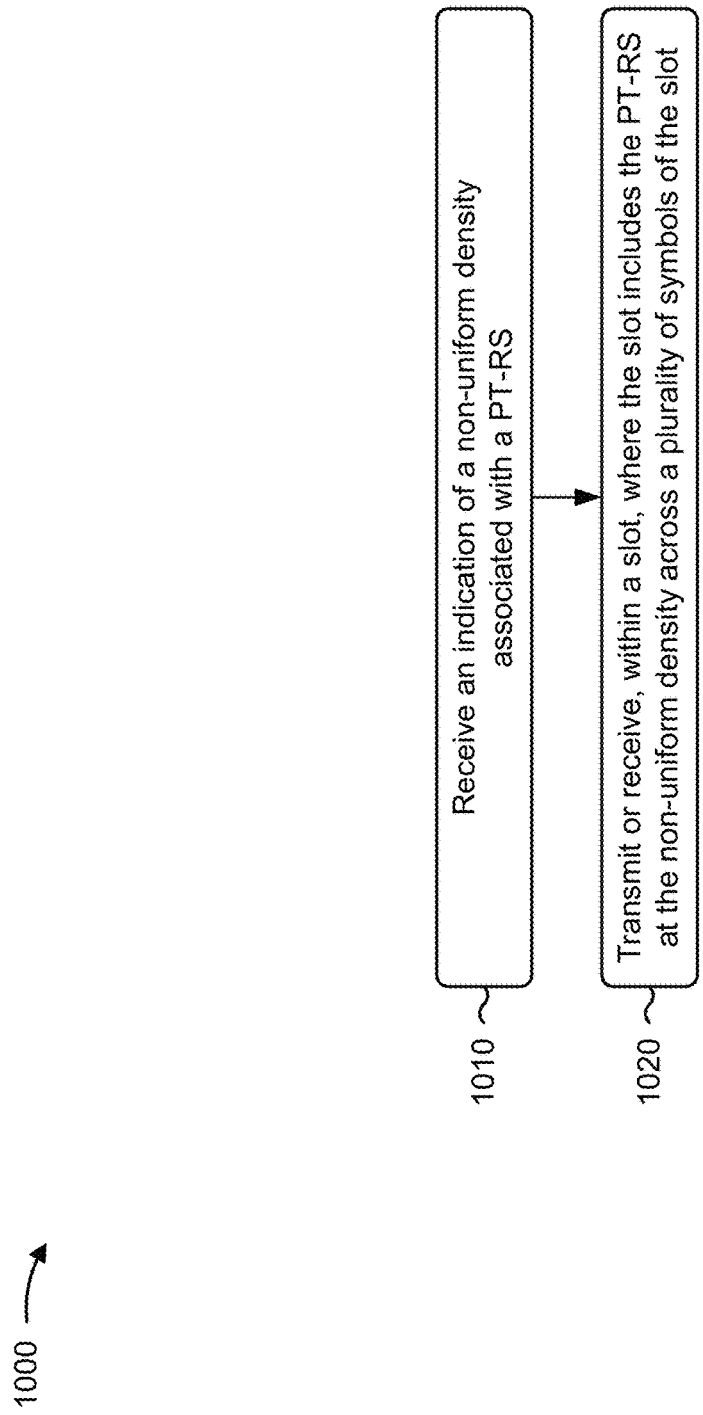

FIG. 10 is a diagram illustrating an example process 1000 performed, for example, by a UE, in accordance with the present disclosure. Example process 1000 is an example where the UE (e.g., UE 120 and/or apparatus 1200 of FIG. 12) performs operations associated with varying densities for PT-RSs.

As shown in FIG. 10, in some aspects, process 1000 may include receiving an indication of a non-uniform density associated with a PT-RS (block 1010). For example, the UE (e.g., using communication manager 140 and/or reception component 1202, depicted in FIG. 12) may receive an indication of a non-uniform density associated with a PT-RS, as described above in connection with FIGS. 5, 6, 7A, and 7B.

In some aspects, the indication is included in an RRC message. Additionally, or alternatively, the indication is included in DCI, a MAC-CE, or a combination thereof. The indication may be included in a dynamic grant associated with the first slot, the second slot, or a combination thereof. For example, the indication may be received after an SFI associated with the first slot, the second slot, or a combination thereof.

As further shown in FIG. 10, in some aspects, process 1000 may include transmitting or receiving, within a slot, where the slot includes the PT-RS at the non-uniform density across a plurality of symbols of the slot (block 1020). For example, the UE (e.g., using communication manager 140, transmission component 1204, and/or reception component 1202, depicted in FIG. 12) may transmit or receive, within a slot, where the slot includes the PT-RS at the non-uniform density across a plurality of symbols of the slot, as described above in connection with FIGS. 5, 6, 7A, and 7B.

In some aspects, the non-uniform density varies across time, frequency, or a combination thereof. In one example, the non-uniform density is greater for one or more symbols, of the plurality of symbols, closer to a start of the slot, than for one or more additional symbols, of the plurality of symbols, closer to an end of the slot. Additionally, or alternatively, the non-uniform density is associated with increasing a periodicity associated with the PT-RS after each DMRS within the slot. Additionally, or alternatively, a subsequent slot is associated with a different density than the non-uniform density. For example, the subsequent slot may be associated with a density of zero.

In some aspects, the slot includes an instance of a DMRS in one symbol, and the PT-RS is included in symbols before the DMRS and in one or more symbols subsequent to the DMRS. Additionally, or alternatively, the slot may be offset from a previous downlink slot including a DMRS. In some aspects, the non-uniform density is applied based on an offset between the slot and a previous downlink slot including a DMRS.

Process 1000 may include additional aspects, such as any single aspect or any combination of aspects described below and/or in connection with one or more other processes described elsewhere herein.

In one aspect, process 1000 further includes transmitting (e.g., using communication manager 140 and/or transmission component 1204) a capability message indicating a recommended non-uniform density, where the indication of the non-uniform density is based on the recommended non-uniform density.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
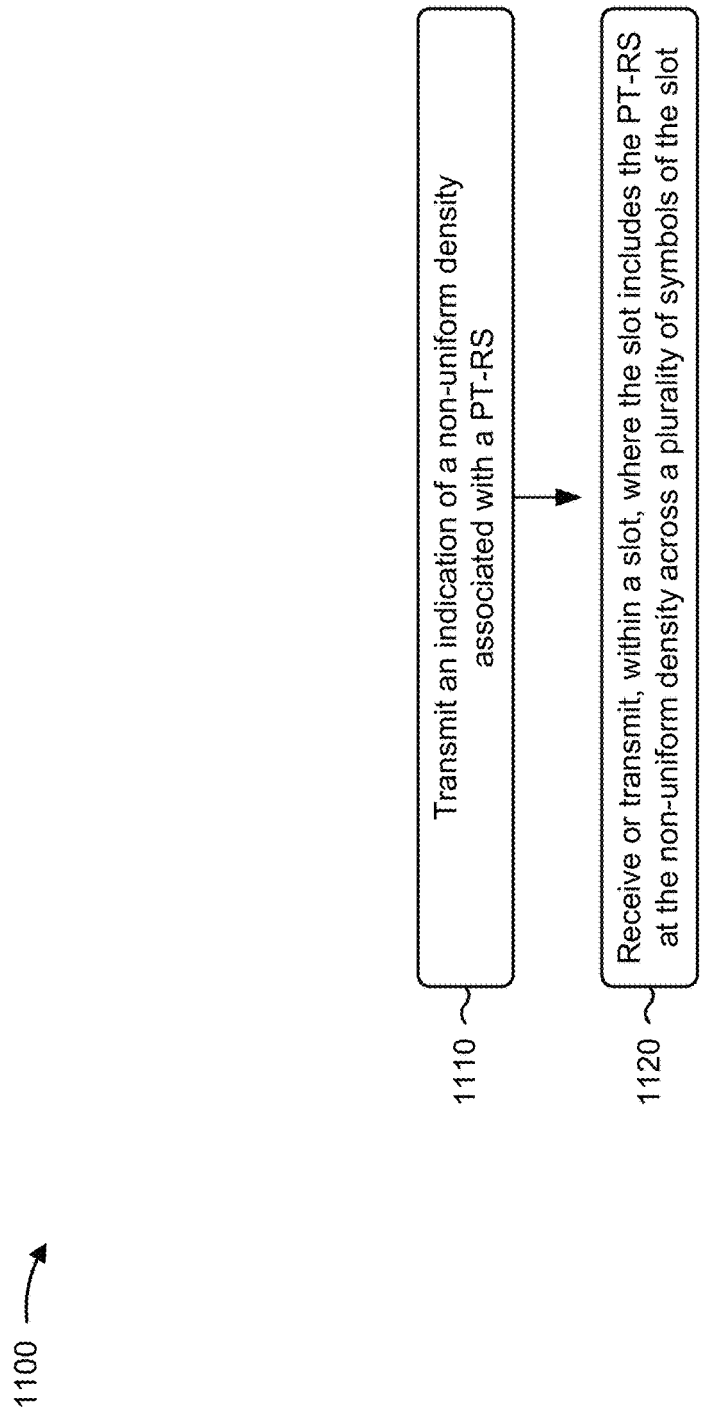

FIG. 11 is a diagram illustrating an example process 1100 performed, for example, by a network entity, in accordance with the present disclosure. Example process 1100 is an example where the network entity (e.g., network entity 501 and/or apparatus 1300 of FIG. 13) performs operations associated with varying densities for PT-RSs.

As shown in FIG. 11, in some aspects, process 1100 may include transmitting an indication of a non-uniform density associated with a PT-RS (block 1110). For example, the network entity (e.g., using communication manager 150 and/or transmission component 1304, depicted in FIG. 13) may transmit an indication of a non-uniform density associated with a PT-RS, as described above in connection with FIGS. 5, 6, 7A, and 7B.

In some aspects, the indication is included in an RRC message. Additionally, or alternatively, the indication is included in DCI, a MAC-CE, or a combination thereof. The indication may be included in a dynamic grant associated with the first slot, the second slot, or a combination thereof. For example, the indication may be transmitted after an SFI associated with the first slot, the second slot, or a combination thereof.

As further shown in FIG. 11, in some aspects, process 1100 may include receiving or transmitting, within a slot, where the slot includes the PT-RS at the non-uniform density across a plurality of symbols of the slot (block 1120). For example, the network entity (e.g., using communication manager 150, reception component 1302, and/or transmission component 1304, depicted in FIG. 13) may receive or transmit, within a slot, wherein the slot includes the PT-RS at the non-uniform density across a plurality of symbols of the slot, as described above in connection with FIGS. 5, 6, 7A, and 7B.

In some aspects, the non-uniform density varies across time, frequency, or a combination thereof. In one example, the non-uniform density is greater for one or more symbols, of the plurality of symbols, closer to a start of the slot, than for one or more additional symbols, of the plurality of symbols, closer to an end of the slot. Additionally, or alternatively, the non-uniform density is associated with increasing a periodicity associated with the PT-RS after each DMRS within the slot. Additionally, or alternatively, a subsequent slot is associated with a different density than the non-uniform density. For example, the subsequent slot may be associated with a density of zero.

In some aspects, the slot includes an instance of a DMRS in one symbol, and the PT-RS is included in symbols before the DMRS and in one or more symbols subsequent to the DMRS. Additionally, or alternatively, the slot may be offset from a previous downlink slot including a DMRS. In some aspects, the non-uniform density is applied based on an offset between the slot and a previous downlink slot including a DMRS.

Process 1100 may include additional aspects, such as any single aspect or any combination of aspects described below and/or in connection with one or more other processes described elsewhere herein.

In one aspect, process 1100 further includes receiving (e.g., using communication manager 150 and/or reception component 1302) a capability message indicating a recommended non-uniform density, wherein the indication of the non-uniform density is based on the recommended non-uniform density.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
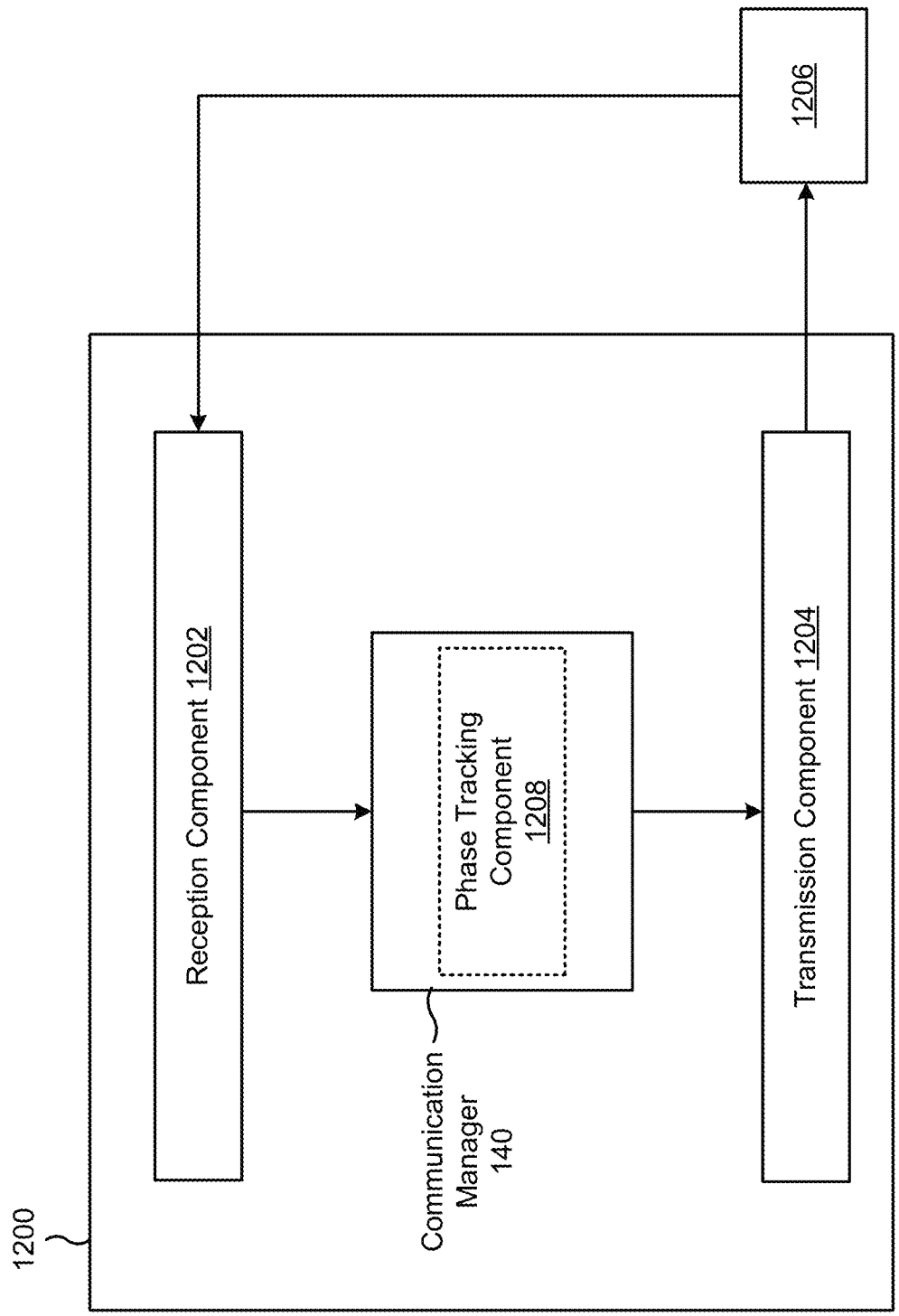
FIGS. 12 and 13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a network entity, or another wireless communication device) using the reception component 1202 and the transmission component 1204. As further shown, the apparatus 1200 may include the communication manager 140. The communication manager 140 may include a phase tracking component 1208, among other examples.

In some aspects, the apparatus 1200 may be configured to perform one or more operations described herein in connection with FIGS. 5, 6, 7A, and 7B. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

In some aspects, the reception component 1202 may receive (e.g., from the apparatus 1206, such as a network entity) an indication of a plurality of densities associated with a PT-RS. Accordingly, the transmission component 1204 may transmit, or the reception component 1202 may receive, across a plurality of slots, where at least a first slot of the plurality of slots includes the PT-RS at a first density of the plurality of densities and a second slot of the plurality of slots includes the PT-RS at a second density of the plurality of densities. Therefore, the phase tracking component 1208 may track a phase of wireless signals (e.g., from the apparatus 1206) across the first slot and the second slot using the PT-RS. The phase tracking component 1208 may include one or more antennas, a modem, a demodulator, a MIMO detector, a receive processor, a controller/processor, a memory, or a combination thereof, of the UE described in connection with FIG. 2. In some aspects, the transmission component 1204 may transmit (e.g., to the apparatus 1206) a capability message indicating one or more recommended densities. Accordingly, the indication of the plurality of densities may be based on the one or more recommended densities.

Additionally, or alternatively, the reception component 1202 may receive (e.g., from the apparatus 1206, such as a network entity) an indication of a non-uniform density associated with a PT-RS. Accordingly, the transmission component 1204 may transmit, or the reception component 1202 may receive, within a slot, where the slot includes the PT-RS at the non-uniform density across a plurality of symbols of the slot. Therefore, the phase tracking component 1208 may track a phase of wireless signals (e.g., from the apparatus 1206) across the plurality of symbols using the PT-RS. In some aspects, the transmission component 1204 may transmit (e.g., to the apparatus 1206) a capability message indicating a recommended non-uniform density. Accordingly, the indication of the non-uniform density may be based on the recommended non-uniform density.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

FIG. 13 is a diagram of an example apparatus 1300 for wireless communication. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a network entity, or another wireless communication device) using the reception component 1302 and the transmission component 1304. As further shown, the apparatus 1300 may include the communication manager 150. The communication manager 150 may include a modulator/demodulator component 1308, among other examples.

In some aspects, the apparatus 1300 may be configured to perform one or more operations described herein in connection with FIGS. 5, 6, 7A, and 7B. Additionally, or alternatively, the apparatus 1300 may be configured to perform one or more processes described herein, such as process 900 of FIG. 9, process 1100 of FIG. 11, or a combination thereof.

In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

In some aspects, the transmission component 1304 may transmit (e.g., to the apparatus 1306, such as a UE) an indication of a plurality of densities associated with a PT-RS. Accordingly, the reception component 1302 may receive, or the transmission component 1304 may transmit, across a plurality of slots, where at least a first slot of the plurality of slots includes the PT-RS at a first density of the plurality of densities and a second slot of the plurality of slots includes the PT-RS at a second density of the plurality of densities. Therefore, the modulator/demodulator component 1308 may encode/decode wireless signals (e.g., to or from the apparatus 1206) across the first slot and the second slot using the PT-RS. The modulator/demodulator component 1308 may include one or more antennas, a modem, a demodulator, a modulator, or a combination thereof, of the base station described in connection with FIG. 2. In some aspects, the reception component 1302 may receive (e.g., from the apparatus 1306) a capability message indicating one or more recommended densities. Accordingly, the indication of the plurality of densities may be based on the one or more recommended densities.

Additionally, or alternatively, the transmission component 1304 may transmit (e.g., to the apparatus 1306, such as a UE) an indication of a non-uniform density associated with a PT-RS. Accordingly, the reception component 1302 may receive, or the transmission component 1304 may transmit, within a slot, where the slot includes the PT-RS at the non-uniform density across a plurality of symbols of the slot. Therefore, the modulator/demodulator component 1308 may encode/decode wireless signals (e.g., to or from the apparatus 1206) across the first slot and the second slot using the PT-RS. In some aspects, the reception component 1302 may receive (e.g., from the apparatus 1306) a capability message indicating a recommended non-uniform density. Accordingly, the indication of the non-uniform density may be based on the recommended non-uniform density.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving an indication of a plurality of densities associated with a phase-tracking reference signal (PT-RS); and transmitting, or receiving, across a plurality of slots, wherein at least a first slot of the plurality of slots includes the PT-RS at a first density of the plurality of densities and a second slot of the plurality of slots includes the PT-RS at a second density of the plurality of densities.

Aspect 2: The method of Aspect 1, wherein the indication is included in a radio resource control (RRC) message.

Aspect 3: The method of any of Aspects 1 through 2, wherein an indication to activate the first density and the second density is included in downlink control information (DCI), a medium access control (MAC) control element (MAC-CE), or a combination thereof.

Aspect 4: The method of any of Aspects 1 through 3, wherein an indication to activate the first density and the second density is included in a dynamic grant associated with the first slot, the second slot, or a combination thereof.

Aspect 5: The method of any of Aspects 1 through 4, wherein the plurality of densities includes a plurality of frequency densities, a plurality of time densities, or a combination thereof.

Aspect 6: The method of any of Aspects 1 through 5, wherein the first density is greater than the second density, and the first slot is closer to an uplink slot than the second slot.

Aspect 7: The method of any of Aspects 1 through 6, wherein the second density is zero.

Aspect 8: The method of any of Aspects 1 through 7, further comprising: transmitting a capability message indicating one or more recommended densities, wherein the indication of the plurality of densities is based on the one or more recommended densities.

Aspect 9: The method of any of Aspects 1 through 8, wherein the first density is a non-uniform density across a plurality of symbols of the first slot.

Aspect 10: A method of wireless communication performed by a network entity, comprising: transmitting an indication of a plurality of densities associated with a phase-tracking reference signal (PT-RS); and receiving, or transmitting, across a plurality of slots, wherein at least a first slot of the plurality of slots includes the PT-RS at a first density of the plurality of densities and a second slot of the plurality of slots includes the PT-RS at a second density of the plurality of densities.

Aspect 11: The method of Aspect 10, wherein the indication is included in a radio resource control (RRC) message.

Aspect 12: The method of any of Aspects 10 through 11, wherein an indication to activate the first density and the second density is included in downlink control information (DCI), a medium access control (MAC) control element (MAC-CE), or a combination thereof.

Aspect 13: The method of any of Aspects 10 through 12, wherein an indication to activate the first density and the second density is included in a dynamic grant associated with the first slot, the second slot, or a combination thereof.

Aspect 14: The method of any of Aspects 10 through 13, wherein the plurality of densities includes a plurality of frequency densities, a plurality of time densities, or a combination thereof.

Aspect 15: The method of any of Aspects 10 through 14, wherein the first density is greater than the second density, and the first slot is closer to an uplink slot than the second slot.

Aspect 16: The method of any of Aspects 10 through 15, wherein the second density is zero.

Aspect 17: The method of any of Aspects 10 through 16, further comprising: receiving a capability message indicating one or more recommended densities, wherein the indication of the plurality of densities is based on the one or more recommended densities.

Aspect 18: The method of any of Aspects 10 through 17, wherein the first density is a non-uniform density across a plurality of symbols of the first slot.

Aspect 19: A method of wireless communication performed by a user equipment (UE), comprising: receiving an indication of a non-uniform density associated with a phase-tracking reference signal (PT-RS); and transmitting, or receiving, within a slot, wherein the slot includes the PT-RS at the non-uniform density across a plurality of symbols of the slot.

Aspect 20: The method of Aspect 19, wherein the indication is included in a radio resource control (RRC) message.

Aspect 21: The method of any of Aspects 19 through 20, wherein the indication is included in downlink control information (DCI), a medium access control (MAC) control element (MAC-CE), or a combination thereof.

Aspect 22: The method of any of Aspects 19 through 21, wherein the indication is included in a dynamic grant associated with the slot.

Aspect 23: The method of any of Aspects 19 through 22, wherein the non-uniform density varies across time, frequency, or a combination thereof.

Aspect 24: The method of any of Aspects 19 through 23, wherein the non-uniform density is greater for one or more symbols, of the plurality of symbols, closer to a start of the slot, than for one or more additional symbols, of the plurality of symbols, closer to an end of the slot.

Aspect 25: The method of any of Aspects 19 through 24, wherein the non-uniform density is associated with increasing a periodicity associated with the PT-RS after each demodulation reference signal (DMRS) within the slot.

Aspect 26: The method of any of Aspects 19 through 25, further comprising: transmitting a capability message indicating a recommended non-uniform density, wherein the indication of the non-uniform density is based on the recommended non-uniform density.

Aspect 27: The method of any of Aspects 19 through 26, wherein a subsequent slot is associated with a different density than the non-uniform density.

Aspect 28: The method of Aspect 27, wherein the subsequent slot is associated with a density of zero.

Aspect 29: The method of any of Aspects 19 through 28, wherein the slot includes an instance of a demodulation reference signal (DMRS) in one symbol, and the PT-RS is included in symbols before the DMRS and in one or more symbols subsequent to the DMRS.

Aspect 30: The method of any of Aspects 19 through 29, wherein the slot is offset from a previous downlink slot including a demodulation reference signal (DMRS).

Aspect 31: The method of any of Aspects 19 through 27, wherein the non-uniform density is applied based on an offset between the slot and a previous downlink slot including a demodulation reference signal (DMRS).

Aspect 32: A method of wireless communication performed by a network entity, comprising: transmitting an indication of a non-uniform density associated with a phase-tracking reference signal (PT-RS); and receiving, or transmitting, within a slot, wherein the slot includes the PT-RS at the non-uniform density across a plurality of symbols of the slot.

Aspect 33: The method of Aspect 32, wherein the indication is included in a radio resource control (RRC) message.

Aspect 34: The method of any of Aspects 32 through 33, wherein the indication is included in downlink control information (DCI), a medium access control (MAC) control element (MAC-CE), or a combination thereof.

Aspect 35: The method of any of Aspects 32 through 34, wherein the indication is included in a dynamic grant associated with the slot.

Aspect 36: The method of any of Aspects 32 through 35, wherein the non-uniform density varies across time, frequency, or a combination thereof.

Aspect 37: The method of any of Aspects 32 through 36, wherein the non-uniform density is greater for one or more symbols, of the plurality of symbols, closer to a start of the slot, than for one or more additional symbols, of the plurality of symbols, closer to an end of the slot.

Aspect 38: The method of any of Aspects 32 through 37, wherein the non-uniform density is associated with increasing a periodicity associated with the PT-RS after each demodulation reference signal (DMRS) within the slot.

Aspect 39: The method of any of Aspects 32 through 38, further comprising: receiving a capability message indicating a recommended non-uniform density, wherein the indication of the non-uniform density is based on the recommended non-uniform density.

Aspect 40: The method of any of Aspects 32 through 39, wherein a subsequent slot is associated with a different density than the non-uniform density.

Aspect 41: The method of Aspect 40, wherein the subsequent slot is associated with a density of zero.

Aspect 42: The method of any of Aspects 32 through 41, wherein the slot includes an instance of a demodulation reference signal (DMRS) in one symbol, and the PT-RS is included in symbols before the DMRS and in one or more symbols subsequent to the DMRS.

Aspect 43: The method of any of Aspects 32 through 42, wherein the slot is offset from a previous downlink slot including a demodulation reference signal (DMRS).

Aspect 44: The method of any of Aspects 32 through 43, wherein the non-uniform density is applied based on an offset between the slot and a previous downlink slot including a demodulation reference signal (DMRS).

Aspect 45: An apparatus for wireless communication at a device, comprising a processor; memory coupled with the processor; and instructions stored in the memory and executable by the processor to cause the apparatus to perform the method of one or more of Aspects 1-9.

Aspect 46: A device for wireless communication, comprising a memory and one or more processors coupled to the memory, the one or more processors configured to perform the method of one or more of Aspects 1-9.

Aspect 47: An apparatus for wireless communication, comprising at least one means for performing the method of one or more of Aspects 1-9.

Aspect 48: A non-transitory computer-readable medium storing code for wireless communication, the code comprising instructions executable by a processor to perform the method of one or more of Aspects 1-9.

Aspect 49: A non-transitory computer-readable medium storing a set of instructions for wireless communication, the set of instructions comprising one or more instructions that, when executed by one or more processors of a device, cause the device to perform the method of one or more of Aspects 1-9.

Aspect 50: An apparatus for wireless communication at a device, comprising a processor; memory coupled with the processor; and instructions stored in the memory and executable by the processor to cause the apparatus to perform the method of one or more of Aspects 10-18.

Aspect 51: A device for wireless communication, comprising a memory and one or more processors coupled to the memory, the one or more processors configured to perform the method of one or more of Aspects 10-18.

Aspect 52: An apparatus for wireless communication, comprising at least one means for performing the method of one or more of Aspects 10-18.

Aspect 53: A non-transitory computer-readable medium storing code for wireless communication, the code comprising instructions executable by a processor to perform the method of one or more of Aspects 10-18.

Aspect 54: A non-transitory computer-readable medium storing a set of instructions for wireless communication, the set of instructions comprising one or more instructions that, when executed by one or more processors of a device, cause the device to perform the method of one or more of Aspects 10-18.

Aspect 55: An apparatus for wireless communication at a device, comprising a processor; memory coupled with the processor; and instructions stored in the memory and executable by the processor to cause the apparatus to perform the method of one or more of Aspects 19-31.

Aspect 56: A device for wireless communication, comprising a memory and one or more processors coupled to the memory, the one or more processors configured to perform the method of one or more of Aspects 19-31.

Aspect 57: An apparatus for wireless communication, comprising at least one means for performing the method of one or more of Aspects 19-31.

Aspect 58: A non-transitory computer-readable medium storing code for wireless communication, the code comprising instructions executable by a processor to perform the method of one or more of Aspects 19-31.

Aspect 59: A non-transitory computer-readable medium storing a set of instructions for wireless communication, the set of instructions comprising one or more instructions that, when executed by one or more processors of a device, cause the device to perform the method of one or more of Aspects 19-31.

Aspect 60: An apparatus for wireless communication at a device, comprising a processor; memory coupled with the processor; and instructions stored in the memory and executable by the processor to cause the apparatus to perform the method of one or more of Aspects 32-44.

Aspect 61: A device for wireless communication, comprising a memory and one or more processors coupled to the memory, the one or more processors configured to perform the method of one or more of Aspects 32-44.

Aspect 62: An apparatus for wireless communication, comprising at least one means for performing the method of one or more of Aspects 32-44.

Aspect 63: A non-transitory computer-readable medium storing code for wireless communication, the code comprising instructions executable by a processor to perform the method of one or more of Aspects 32-44.

Aspect 64: A non-transitory computer-readable medium storing a set of instructions for wireless communication, the set of instructions comprising one or more instructions that, when executed by one or more processors of a device, cause the device to perform the method of one or more of Aspects 32-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   memory; and
   one or more processors, coupled to the memory, configured to:
   transmit a capability message indicating a recommended non-uniform density;
   receive an indication of a non-uniform density associated with a phase-tracking reference signal (PT-RS), wherein the indication of the non-uniform density is based on the recommended non-uniform density; and
   transmit, or receive, within a slot, wherein the slot includes the PT-RS at the non-uniform density across a plurality of symbols of the slot.

2. The apparatus of claim 1, wherein the indication is included in a radio resource control (RRC) message.

3. The apparatus of claim 1, wherein the indication is included in downlink control information (DCI), a medium access control (MAC) control element (MAC-CE), or a combination thereof.

4. The apparatus of claim 1, wherein the indication is included in a dynamic grant associated with the slot.

5. The apparatus of claim 1, wherein the non-uniform density varies across time, frequency, or a combination thereof.

6. The apparatus of claim 1, wherein the non-uniform density is greater for one or more symbols, of the plurality of symbols, closer to a start of the slot, than for one or more additional symbols, of the plurality of symbols, closer to an end of the slot.

7. The apparatus of claim 1, wherein the non-uniform density is associated with increasing a periodicity associated with the PT-RS after each demodulation reference signal (DMRS) within the slot.

8. The apparatus of claim 1, wherein a subsequent slot is associated with a different density than the non-uniform density.

9. The apparatus of claim 8, wherein the subsequent slot is associated with a density of zero.

10. The apparatus of claim 1, wherein the slot includes an instance of a demodulation reference signal (DMRS) in one symbol, and the PT-RS is included in symbols before the DMRS and in one or more symbols subsequent to the DMRS.

11. The apparatus of claim 1, wherein the slot is offset from a previous downlink slot including a demodulation reference signal (DMRS).

12. The apparatus of claim 1, wherein the non-uniform density is applied based on an offset between the slot and a previous downlink slot including a demodulation reference signal (DMRS).

13. An apparatus for wireless communication at a network entity, comprising:
  memory; and
  one or more processors, coupled to the memory, configured to:
    receive a capability message indicating a recommended non-uniform density;
    transmit an indication of a non-uniform density associated with a phase-tracking reference signal (PT-RS), wherein the indication of the non-uniform density is based on the recommended non-uniform density; and
    receive, or transmit, within a slot, wherein the slot includes the PT-RS at the non-uniform density across a plurality of symbols of the slot.

14. The apparatus of claim 13, wherein the indication is included in a radio resource control (RRC) message.

15. The apparatus of claim 13, wherein the indication is included in downlink control information (DCI), a medium access control (MAC) control element (MAC-CE), or a combination thereof.

16. The apparatus of claim 13, wherein the indication is included in a dynamic grant associated with the slot.

17. The apparatus of claim 13, wherein the non-uniform density varies across time, frequency, or a combination thereof.

18. The apparatus of claim 13, wherein the non-uniform density is greater for one or more symbols, of the plurality of symbols, closer to a start of the slot, than for one or more additional symbols, of the plurality of symbols, closer to an end of the slot.

19. The apparatus of claim 13, wherein the non-uniform density is associated with increasing a periodicity associated with the PT-RS after each demodulation reference signal (DMRS) within the slot.

20. The apparatus of claim 13, wherein a subsequent slot is associated with a different density than the non-uniform density.

21. The apparatus of claim 20, wherein the subsequent slot is associated with a density of zero.

22. The apparatus of claim 13, wherein the slot includes an instance of a demodulation reference signal (DMRS) in one symbol, and the PT-RS is included in symbols before the DMRS and in one or more symbols subsequent to the DMRS.

23. The apparatus of claim 13, wherein the slot is offset from a previous downlink slot including a demodulation reference signal (DMRS).

24. The apparatus of claim 13, wherein the non-uniform density is applied based on an offset between the slot and a previous downlink slot including a demodulation reference signal (DMRS).

25. A method of wireless communication performed by a user equipment (UE), comprising:
  transmitting a capability message indicating a recommended non-uniform density;
  receiving an indication of a non-uniform density associated with a phase-tracking reference signal (PT-RS), wherein the indication of the non-uniform density is based on the recommended non-uniform density; and
  transmitting, or receiving, within a slot, wherein the slot includes the PT-RS at the non-uniform density across a plurality of symbols of the slot.

26. The method of claim 25, wherein the slot is offset from a previous downlink slot including a demodulation reference signal (DMRS).

27. The method of claim 25, wherein the non-uniform density is applied based on an offset between the slot and a previous downlink slot including a demodulation reference signal (DMRS).

28. A method of wireless communication performed by a network entity, comprising:
  receiving a capability message indicating a recommended non-uniform density;
  transmitting an indication of a non-uniform density associated with a phase-tracking reference signal (PT-RS), wherein the indication of the non-uniform density is based on the recommended non-uniform density; and
  receiving, or transmitting, within a slot, wherein the slot includes the PT-RS at the non-uniform density across a plurality of symbols of the slot.

* * * * *